(12) United States Patent
Apostolopoulos et al.

(10) Patent No.: US 6,404,814 B1
(45) Date of Patent: Jun. 11, 2002

(54) TRANSCODING METHOD AND TRANSCODER FOR TRANSCODING A PREDICTIVELY-CODED OBJECT-BASED PICTURE SIGNAL TO A PREDICTIVELY-CODED BLOCK-BASED PICTURE SIGNAL

(75) Inventors: John G. Apostolopoulos; Susie J. Wee, both of Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/561,315

(22) Filed: Apr. 28, 2000

(51) Int. Cl.[7] .................................................. H04N 7/12
(52) U.S. Cl. ............................. 375/240.12; 375/240.08
(58) Field of Search ........................ 375/240.12, 240.08, 375/240.1, 240.13, 240.14, 240.16, 240.26; 348/390.1, 399.1, 425.1; 382/235, 236, 238, 243; 386/109, 111

(56) References Cited

U.S. PATENT DOCUMENTS 6,167,084 A * 12/2000 Wang et al. ........... 375/240.02
6,275,536 B1 * 8/2001 Chen et al. ............ 375/240.25
2001/0047517 A1 * 11/2001 Christopoulos et al. ....... 725/87

OTHER PUBLICATIONS

Noguchi et al., "MPEG video compositing in the compressed domain", ISCAS '96, vol. 2, pp. 596–599, 1996.*
Shih–Fu Chang et al., "Manipulation and compositing of MC–DCT compressed video", IEEE Journal on Selected Areas in Communications, vol. 13, iss. 1, pp. 1–11, Jan. 1995.*

* cited by examiner

Primary Examiner—Vu Le

(57) ABSTRACT

A predictively-coded object-based picture signal representing a group of pictures is transcoded into a predictively-coded block-based picture signal representing the group of pictures by extracting a coded scene descriptor and coded object descriptors from the predictively-coded object-based picture signal. The coded scene descriptor is decoded to generate a scene descriptor. The coded object descriptors are partially decoded to generate respective partially-decoded object descriptors. The decoding extracts coding information that describes the predictive coding of the coded object descriptors. In response to the scene descriptor, a frame of a partially-encoded block-based picture signal representing one of the pictures as a current picture is generated from the partially-decoded object descriptors. Finally, a frame of the predictively-coded block-based picture signal representing the current picture is generated by predictively coding the partially-coded block-based picture signal to a uniform coding state in response to the coding information.

32 Claims, 17 Drawing Sheets

TRANSCODING METHOD AND TRANSCODER FOR TRANSCODING A PREDICTIVELY-CODED OBJECT-BASED PICTURE SIGNAL TO A PREDICTIVELY-CODED BLOCK-BASED PICTURE SIGNAL

FIELD OF THE INVENTION

The invention relates to coded signals that represent groups of pictures using fewer bits than conventional picture signals and, in particular, to a transcoding method and transcoder that transcodes a predictively-coded object-based picture signal representing a group of pictures to a predictively-coded block-based picture signal representing the group of pictures to allow a conventional block-based picture signal decoder to decode the predictively-coded object-based picture signal.

BACKGROUND OF THE INVENTION

Communication using picture signals that electronically represent moving pictures is becoming ubiquitous, together with the use of signal coding to increase the efficiency with which such signals can be transmitted and stored. Signal coding is crucial to overcome the many limitations that exist on transmission bandwidth and storage capacity. Most of the popular and successful picture signal coding techniques, such as those known as MPEG-1, MPEG-2, ITU H.261 and ITU H.263, code the original picture signal by subjecting it to block-based processing. In block-based processing, each picture in a group of pictures constituting at least part of a moving picture is expressed as an array of picture elements (pixels), e.g., an array of 640×480 pixels, each of which has a pixel value. The pixel values for the picture collectively constitute a frame of the picture signal. Each picture is divided into regularly-sized and located square or rectangular blocks of pixels. Processing, such as a block discrete cosine transform (block-DCT), is then individually applied to each block of pixel values constituting the picture to code the picture signal representing the picture. The picture is divided into blocks regardless of the sizes and shapes of the objects represented by the picture.

Although picture signals representing moving pictures can be and are coded simply by applying block DCTs to the blocks of pixel values constituting the frame of the picture signal representing each picture, the coding efficiency is substantially increased by eliminating the substantial temporal redundancy that exists in such picture signals. In such coding schemes as MPEG-1 and MPEG-2, the temporal redundancy is substantially reduced by applying predictive coding with motion compensation. As a result of such coding, the picture signal represents only the differences between the current picture and its reference picture, i.e., the picture or pictures that form the basis for predictively coding the current picture. A picture signal that represents a moving picture and that has been predictively coded using motion compensation is called a predictively-coded picture signal in this disclosure on the understanding that such a picture signal has additionally been subject to spatial coding. In conventional block-based coding schemes such as MPEG-1 and MPEG-2, block-based motion estimation and block-based motion compensation are used. A picture signal coded in this manner will be called a predictively-coded block-based picture signal.

Recently, techniques have been developed for generating object-based picture signals that represent a picture as a number of objects arranged in a scene. In an object-based picture signal, a picture, which may be a single still picture, or one of a group of sequential still pictures constituting a moving picture, is decomposed into objects having arbitrary shapes, unlike the regularly-sized and located blocks of current block-based representations. Each object is represented by a portion of the picture signal.

Techniques have also been proposed for coding such object-based picture signals, the foremost example of which is that embodied in the recent MPEG-4 standard. In a coded object-based picture signal, spatial coding is applied to each signal portion representing an object. When the object-based picture signal represents a moving picture, each signal portion representing an object is additionally predictively coded using, for example, object-based motion estimation and object-based motion compensation to increase the coding efficiency.

Decomposing the picture into signal portions representing arbitrarily-shaped, movable objects provides a more natural decomposition of the picture signal that enables a number of new or enhanced functionalities, such as user interaction with the objects in the picture, greater content-creation flexibility, and potentially improved coding efficiency and fidelity. The advantages of representing pictures using object-based picture signals are especially likely to appeal to content creators.

Object-based picture signals require object-based coding techniques such as MPEG-4 to code, manipulate, and distribute them. However, an object-based decoder, such as an MPEG-4 decoder, that is required to decode a coded object-based picture signal, is inherently more complex than conventional block-based MPEG-1 or MPEG-2 decoders. Moreover, the spread of DVD, Digital TV and HDTV has put MPEG-2 decoders into widespread use. Therefore, for users who already have an MPEG-1 or -2 decoder, and who do not want or cannot afford the additional functionalities offered by an object-based picture signal, the need arises to transcode the MPEG-4 object-based picture signal to an MPEG-1 or -2 block-based picture signal. Moreover, while program content may be developed using object-based picture signals, it may be desirable to distribute the object-based content to people who only have conventional block-based decoders, such as the MPEG-1 or -2 decoders used in DVD, satellite and terrestrial digital television. Consequently, a need exists to be able to transcode predictively-coded object-based picture signals to predictively-coded block-based picture signals that are compatible with the standard decoders of such predictive, block-based coding techniques as MPEG-1, MPEG-2, H.261 and H.263.

FIG. 1 is a block diagram of a conventional transcoder 10 capable of transcoding an MPEG-4 or other predictively-coded object-based picture signal to an MPEG-2 or other predictively-coded block-based picture signal. The system is composed of the MPEG-4 decoder 12 and the MPEG-2 encoder 14. The output 18 of the MPEG-4 decoder is connected to the input 20 of the MPEG-2 encoder. The output 22 of the MPEG-2 decoder provides a predictively-coded block-based picture signal that is compliant with the standard MPEG-2 decoder.

The input 16 of the MPEG-4 decoder receives a predictively-coded object-based picture signal that is compliant with the MPEG-4 standard decoder. The MPEG-4 decoder decodes the predictively-coded object-based is picture signal to generate a conventional picture signal, which it feeds to its output 18. The conventional picture signal may be a set of RGB signals, a set of YIQ or YUV signals or some other suitable form of conventional picture signal.

The MPEG-2 encoder receives the conventional picture signal at its input 20 and applies conventional block-based spatial and temporal coding thereto. The MPEG-2 encoder delivers a predictively-coded block-based picture signal that is compliant with the MPEG-2 standard decoder to its output 22.

The conventional transcoder 10, although simple in concept, is complex in execution. The spatial and temporal coding processing performed by the MPEG-2 encoder is complex and requires substantial computational resources to perform in real time. The demand for computational resources is particularly severe because the MPEG-2 encoder performs motion estimation from scratch. Furthermore, the decoding and subsequent encoding performed by the transcoder 10 often degrades the quality of the picture.

An alternative approach is to perform the transcoding in the coded domain. This would eliminate the need to perform at least part of the re-encoding. Transcoding in the coded domain has the potential to reduce significantly the processing complexity, and also to eliminate partially or completely the generation loss suffered by conventional transcoding.

Some approaches to transcoding block-based picture signals in the coded domain are described by S. F. Chang and D. Messerschmitt in *Manipulation and Compositing of MC-DCT Compressed Video,* 13 IEEE J. on Selected Areas in Communications (January 1995); B. Natarajan and B. Vasudev in *A Fast Approximate Algorithm for Scaling Down Digital Images in the DCT Domain,* PROC. IEEE Intl. Conf. on Image Processing (Washington D.C.) (October 1995); N. Merhav and B. Vasudev, *Fast Algorithms for DCT-Domain Image Down Sampling and for Inverse Motion Compensation,* 7 IEEE Trans. on Circuits and Systems for Video Technology, 468–475 (June 1997); B. Shen and I. Ishwar in *Block-based Manipulations on Transform-Compressed Images and Videos,* 6 Multimedia Systems (March 1998); S. Wee and B. Vasudev in *Splicing MPEG Video Streams in the Compressed Domain,* PROC. IEEE Intl. Conf. on Multimedia Signal Processing (Princeton, N.J.) (June 1997).

However, none of the above-cited references describes a transcoder for transcoding a predictively-coded object-based picture signal to a predictively-coded block-based picture signal and that operates in the coded domain. What is needed, therefore, is transcoder and transcoding method that operate in the coded domain and are capable of transcoding a predictively-coded object-based picture signal into a corresponding predictively-coded block-based picture signal. What is also needed is such a transcoder and transcoding method that operate in real-time or in real time with a delay of several frames. Finally, what is needed is such a transcoder and transcoding method that have modest and affordable hardware requirements.

SUMMARY OF THE INVENTION

The invention provides a method for transcoding a predictively-coded object-based picture signal representing a group of pictures to a predictively-coded block-based picture signal representing the group of pictures. In the method, a coded scene descriptor and coded object descriptors are extracted from the predictively-coded object-based picture signal and the coded scene descriptor is decoded to generate a scene descriptor. The coded object descriptors are partially decoded to generate respective partially-decoded object descriptors. The partial decoding extracts coding information that describes the coding of the coded object descriptors. In response to the scene descriptor, a frame of a partially-encoded block-based picture signal representing one of the pictures as a current picture is generated from the partially-decoded object descriptors. Finally, a frame of the predictively-coded block-based picture signal representing the current picture is generated by predictively coding the partially-coded block-based picture signal to a uniform coding state in response to the coding information.

The invention also provides a transcoder for transcoding a predictively-coded object-based picture signal representing a group of pictures to a predictively-coded block-based picture signal representing the group of pictures. The transcoder comprises a partial decoder, a block-based picture signal generator, and a partial encoder. The partial decoder includes a demultiplexer, a scene descriptor decoder and an object descriptor decoder. The demultiplexer extracts a coded scene descriptor and coded object descriptors from the predictively-coded object-based picture signal. The scene descriptor decoder decodes the coded scene descriptor to generate a scene descriptor. The object descriptor decoder partially decodes the coded object descriptors to generate respective partially-decoded object descriptors and extracts coding information that describes the coding of the coded object descriptors. The block-based picture signal generator operates in response to the scene descriptor to generate from the partially-decoded object descriptors a frame of a partially-encoded block-based picture signal representing one of the pictures as a current picture. The partial encoder is configured to generate a frame of the predictively-coded block-based picture signal representing the current picture by predictively coding, in response to at least part of the coding information, the partially-coded block-based picture signal to a uniform coding state.

Finally, the invention provides a computer-readable medium in which is fixed a computer program that instructs a computer to perform the above-described transcoding method.

The transcoder and transcoding method according to the invention operate in the coded domain and transcode a predictively-coded object-based picture signal into a corresponding predictively-coded block-based picture signal. Operating in the coded domain saves substantial processing resources since considerable amounts of decoding processing and encoding processing are not performed compared with the conventional approach. Moreover, the transcoder and transcoding method according to the invention use coding information extracted from the predictively-coded object-based picture signal to apply predictive coding to the block-based picture signal. This saves additional processing since the need to perform resource-intensive motion estimation is eliminated for all but a few blocks. Thus, the transcoder and transcoding method according to the invention can operate in real-time or near real time and can be implemented using modest and affordable hardware.

DETAILED DESCRIPTION OF THE INVENTION

Before describing the invention in detail, ways of representing moving pictures using predictively-coded block-based picture signals and predictively-coded object-based picture signals will be briefly described. The coders to be described operate on a digital picture signal that represents a group of still pictures constituting all or part of a moving picture. Each picture is divided into a rectangular array of picture elements (pixels). For example, each picture represented by a frame of a conventional NTSC television signal is divided into an array of 640×480 pixels. Each frame of the digital picture signal includes a pixel value for each pixel. The pixel value defines at least a grey-scale value for the pixel and may additionally specify the color of the pixel. The pixel values are conventionally arranged in raster-scan order starting at the top left-hand corner of the picture.

A conventional block-based coder receives the digital picture signal and derives therefrom a coded picture signal that represents the group of pictures using fewer bits. A conventional block-based coder transforms the digital picture signal to another domain in which most of the signal energy is concentrated in a small fraction of the coefficients. Most commonly, each picture is partitioned into two-dimensional blocks of 8×8 pixels, and the two-dimensional discrete cosine transform (DCT) of each corresponding block of pixel values is calculated. This transform is often referred to as an 8×8 Block DCT. Other popular spatial transforms, such as lapped transforms and wavelet transforms, can alternatively be used.

Figure 1:
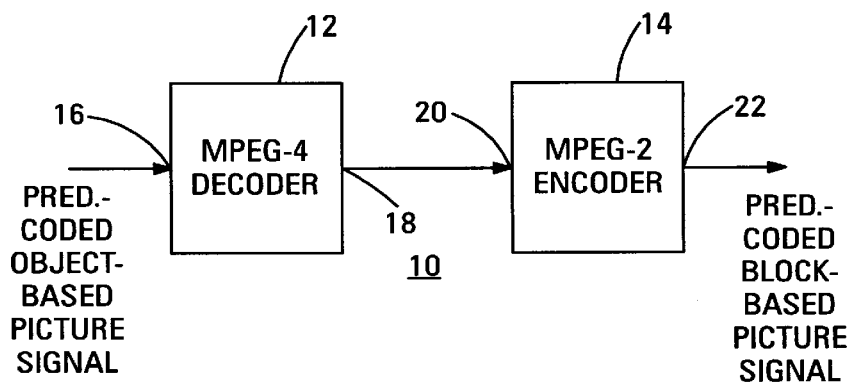
FIG. 1 is a block diagram of a conventional transcoder for transcoding a predictively-coded object-based picture signal to a predictively-coded block-based picture signal.
Figure 2A:
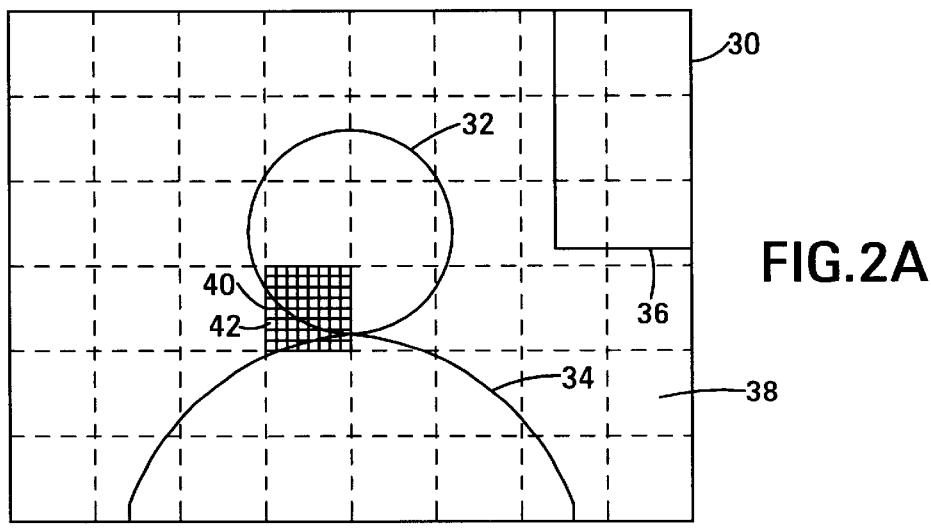
FIG. 2A illustrates the way in which an exemplary picture is encoded by a block-based encoder.

The conventional block-based coder divides each picture into blocks of 8×8 pixels regardless of the content of the picture. FIG. 2A shows the picture 30 that includes the person's head 32, the person's body 34, the window 36 and the background 38. An exemplary block of 8×8 pixels is shown at 40 and an exemplary pixel in the block 40 is shown at 42. The pixels of the other blocks are not shown to simplify the drawing. The block 40 includes parts of the three objects 32, 34 and 38.

Figure 3A:
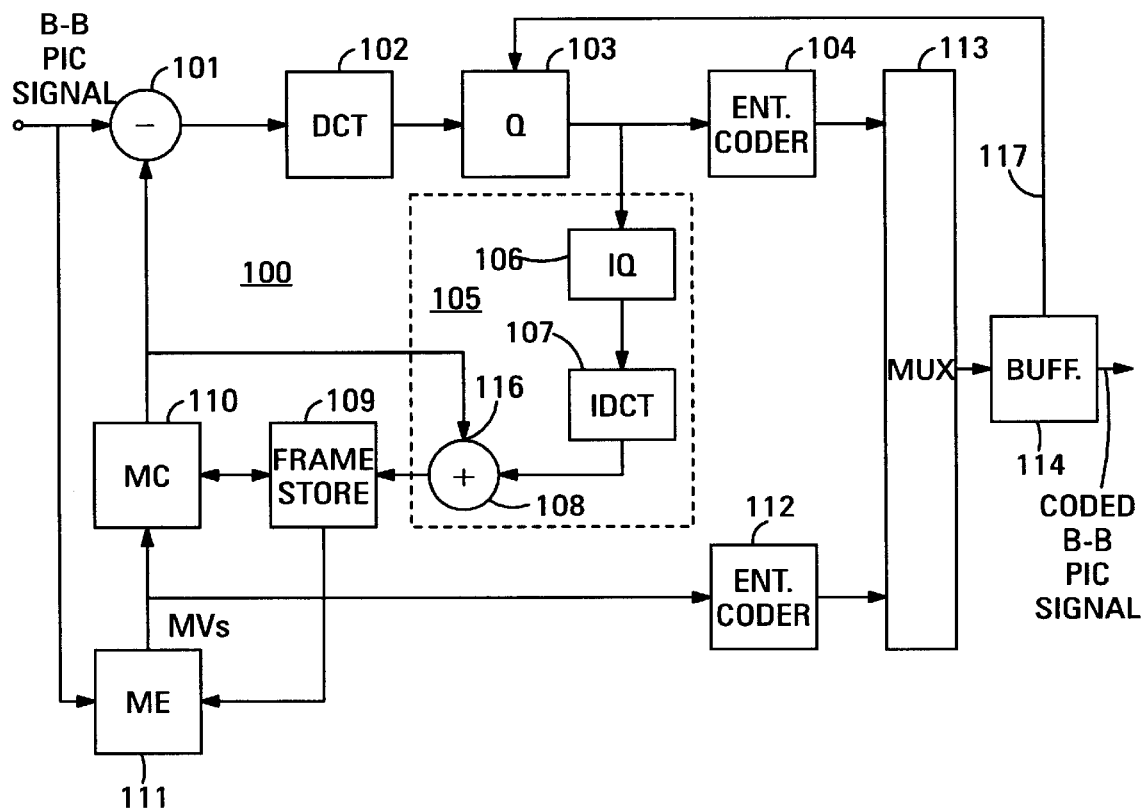
FIG. 3A is a block diagram showing a conventional encoder that generates a predictively-coded block-based picture signal.

FIG. 3A shows a conventional encoder 100 for a picture signal representing a moving picture. The encoder is composed of the subtraction node 101; the transform processor (DCT) 102; the quantizer (Q) 103; the entropy coders 104 and 112; the local decoder 105 composed of the inverse quantizer (IQ) 106, the inverse transform processor (IDCT) 107 and the summing node 108; the frame store 109; the motion compensator (MC) 110; the motion estimator (ME) 111; the multiplexer (MUX) 113 and the output buffer (BUFF) 114.

A picture signal representing a moving picture is composed of frames each of which represents a still picture. The pictures are displayed in rapid succession to give the impression of continuous motion. The high picture rate necessary to achieve the illusion of smooth motion usually results in considerable temporal redundancy among consecutive pictures. Specifically, consecutive pictures may typically contain the same information physically displaced between adjacent pictures. To reduce the temporal redundancy, predictive coding is typically applied between the picture being coded, i.e., the current picture, and one or more previously-coded pictures. The one or more previously-coded pictures are used as the basis for encoding the current picture. The current picture is then coded by coding the differences between the current picture and a prediction based on the previously-coded picture or pictures.

The accuracy of the predictive coding is greatly improved, and the magnitude of the differences that need coding is greatly reduced, by accounting for the motion between the current picture and the previously-coded picture or pictures. In the coder 100, the motion estimator 111 estimates the motion between the current picture and one or more previously-coded pictures. In response to the motion estimation generated by the motion estimator, the motion compensator 110 builds a reference picture that provides the basis for coding the current picture. In building the reference picture, the motion compensator modifies the one or more previously-coded pictures to account for the motion between the current picture and the previously-coded pictures. When more than one previously-coded pictures are used as the basis for coding the current picture, usually one of the previously-coded pictures precedes the current picture, and the other of the previously-coded pictures follows the current picture in presentation order. However, regardless of the presentation order, the current picture can only be coded after the previously-coded pictures have been coded.

Motion estimation is typically performed by partitioning each picture into square blocks of pixels and estimating the motion between each block, called a current block and a block of the previously-coded picture that most closely matches the current block. Each block on which the motion estimation is performed, called a macroblock, typically has twice the linear dimensions of the blocks to which the DCT is applied. Motion estimation is a computationally intensive process since it involves performing matching operations between the current block in the current picture, and all of the macroblocks located within ±n pixels of the corresponding position in the one or more previously-coded pictures. Moreover, the matching operation can be extended to synthesized macroblocks displaced by one-half of a pixel from the actual macroblocks. The matching operations determine the location of the macroblock in the one or more previously-coded pictures that is most similar to the current block. When n=1, nine matching operations are required for integer-pixel accuracy and 17 for one-half pixel accuracy. The number of matching operations increases in proportion to the square of n.

For each block of the current picture as a current block, the motion estimator 111 determines a motion vector (MV) that represents the motion between the current block and the block of the one or more previously-coded pictures that most closely matches the current block. The motion estimator feeds the motion vectors for the current picture to the motion compensator 110 and to the entropy coder 112, which will be described in more detail below.

The encoder 100 normally codes the first frame of the picture signal without prediction. The first frame is the frame of the picture signal that represents the first picture in a group of pictures. The first frame of the block-based picture signal is fed to one input of the subtraction node 101. When the first frame is coded, no signal is fed to the negative input of the subtraction node 101, so that the signal output by the subtraction node is identical to the first frame of the block-based picture signal. The transform processor 102 applies block transform processing to each block of 8×8 pixel values in the frame to generate a respective block of 8×8 transform coefficients. The quantizer 103 quantizes the blocks of transform coefficients by scaling each coefficient by an appropriate factor to account for the psycho-visual characteristics of the human vision system (HVS). After scaling, each transform coefficient is quantized with a quantizing step size that depends on the number of bits available to represent the current picture in its coded state. Quantizing reduces the value of many of the transform coefficients to zero.

The entropy coder 104 subjects the blocks of quantized transform coefficients generated by the quantizer 103 to entropy coding. Entropy coding includes runlength coding and Huffman coding. Runlength coding exploits the fact that the majority of the transform coefficients are quantized to zero by coding only the locations and amplitudes of the non-zero quantized coefficients. This reduces the number of bits required to represent the block of quantized transform coefficients. The block of quantized transform coefficients is typically scanned in zig-zag order, and the number (i.e., the runlength) of consecutive zero-level transform coefficients before a non-zero level coefficient is coded. The runlength is followed by a code that represents the level of the non-zero coefficient.

The entropy coder 104 additionally applies Huffman coding to the runlength-level pairs generated by the runlength coding to exploit the statistical properties of these quantities. This further reduces the number of bits required to represent each block of quantized transform coefficients.

The processing just described can usually generate a frame of a coded picture signal that represents the first picture using substantially fewer bits than the number of bits in the first frame of the picture signal. However, the processing is less effective when applied to blocks, such as the block 40 shown in FIG. 2A, that include two or more unrelated objects.

The blocks of entropy-coded, quantized transform coefficients generated by the entropy coder 104 are fed to the multiplexer 113. When the current picture is coded without prediction, these blocks represent the sole output of the coding performed by the encoder 100. These blocks alone therefore pass to the buffer 114, which generates the first frame of the predictively-coded block-based picture signal as the output of the encoder. The buffer additionally generates the control signal 117 that is fed back to the quantizer 103. This control signal controls the step-size of the quantizing to ensure that the buffer neither under flows nor over flows.

The blocks of quantized transform coefficients generated by the quantizer 103 from the first frame of the picture signal are additionally fed to the local decoder 105. In the local decoder, the inverse quantizer 106 applies quantizing inverse to that applied by the quantizer 103 to the blocks of quantized transform coefficients. The inverse transform processor 107 inversely transforms the blocks of transform coefficients resulting from the inverse quantizing, and feeds blocks of pixel values to the summing node 108. Since the first frame is coded without prediction, the motion compensator 110 feeds no reference blocks to the input 116 of the summing node, and the output of the summing mode is identical to its input. The summing node generates a frame of a regenerated picture signal that represents a regenerated version of the first picture. This frame is stored in a page of the frame store 109. The regenerated version of the current picture represented by the regenerated picture signal stored in the frame store differs subtly from the current picture due to losses introduced by the coding process.

After the first frame of the picture signal has been coded, the second frame of the picture signal is coded. The second frame of the picture signal represents the second picture in the group of pictures in coding order. The frames of the picture signal representing the second and subsequent pictures in the group of pictures are normally coded predictively. When second frame is coded, the second picture becomes the current picture, and the first picture becomes the reference picture for coding the current picture.

Each frame of the block-based picture signal is fed to the motion estimator 111. The motion estimator performs motion estimation between the current picture and its reference picture and determines the motion vectors for predictively coding the current picture. For each block of the current picture as a current block, the motion estimator generates a motion vector that indicates the spatial displacement between the current block and a block of the reference picture that most closely matches the current block. The motion estimator feeds the motion vectors for the current picture to the motion compensator 110 and to the entropy coder 112. The entropy coder applies entropy coding, described above, to the motion vectors and feeds the coded motion vectors to the multiplexer 113.

In response to each motion vector received from the motion estimator 111, the motion compensator 110 causes the frame store 109 to feed to it the block of the regenerated picture signal indicated by the motion vector. The motion compensator uses the blocks of the regenerated picture signal to build the reference picture for the current picture. The reference picture is composed of one reference block for each block of the current picture.

When the encoder 100 predictively codes each block of the current picture, the motion compensator 110 feeds the corresponding block of the reference picture, i.e., the reference block, to the subtraction node 101. The subtraction node subtracts the reference block from the current block to generate a block of motion compensation errors called MC residuals.

The block of MC residuals is then coded using transform module 102, the quantizer 103 and the entropy coder 104, as described above. Quantizing characteristics different from those described above are used to quantize the block of transformed MC residuals to account for the different spectral distributions in a block of transform coefficients derived from a block of the picture signal itself and one derived from a block of MC residuals.

The blocks of entropy-coded, quantized transform coefficients generated by the entropy coder 104 from the blocks of MC residuals are fed to the multiplexer 113. Signal blocks resulting from multiplexing the motion vectors and the MC residuals pass to the buffer 114, which generates the frame of the predictively-coded block-based picture signal that constitutes the output of the encoder 100.

The motion compensator 110 additionally feeds the reference block for the current block to the input 116 of the summing node 108 in the local decoder 105. The summing node adds the reference block to the block of regenerated MC residuals output by the inverse transform processor 107 to generate a block of pixel values as a block of a frame of a regenerated picture signal that represents a regenerated version of the current picture. The regenerated picture signal is stored in a page of the frame store 109 different from that in which the regenerated picture signal representing the first picture is stored.

The frames of the picture signal that represent the third and subsequent pictures of the group of pictures may be predictively coded using bidirectional motion compensation (Bi-MC) or backward motion compensation (B-MC) in addition to the forward motion compensation (F-MC) just described. When bidirectional motion compensation is applied, the motion compensator 110 generates the picture signal representing the reference picture for the current picture from the regenerated picture signals representing two pictures, one previous to, the other one following (in presentation order) the current picture in the group of pictures. When backward motion compensation is applied, the motion compensator generates the picture signal that represents the reference picture for the current picture from the regenerated picture signal that represents a single picture following (in presentation order) the current picture in the group of pictures.

Regardless of whether forward, backward or bidirectional motion compensation is used, if predictively coding the current block requires more bits than non-predictively coding the current block, then the MC-processing is turned off and the current block is coded non-predictively. Alternatively, MC-processing may be turned off for coding the entire current picture only when coding the entire current picture predictively would require more bits than coding the current picture without prediction.

Figure 3B:
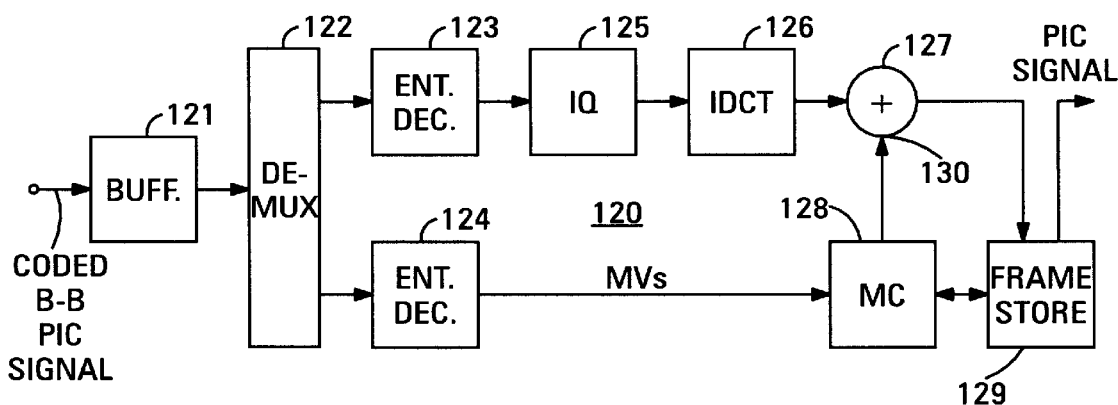
FIG. 3B is a block diagram showing a conventional decoder for a predictively-coded block-based picture signal.

FIG. 3B shows an exemplary decoder 120 for the predictively-coded block-based picture signal generated by the encoder 100. The decoder is composed of the buffer (BUFF) 121, the demultiplexer (DEMUX) 122, the entropy decoders (ENT. DEC.) 123 and 124, the inverse quantizer (IQ) 125, the inverse transform processor (IDCT) 126, the summing node 127, the motion compensator (MC) 128 and the frame store 129.

The buffer 121 buffers the predictively-coded block-based picture signal. The demultiplexer 122 removes the frames of the predictively-coded block-based picture signal from the buffer and separates the predictively-coded block-based picture signal into its constituent parts. These parts include blocks of entropy-coded, quantized transform coefficients and, for most of the pictures, a set of entropy-coded motion vectors. The entropy decoder 123 applies entropy decoding to the blocks of entropy-coded, quantized transform coefficients to generate blocks of quantized transform coefficients. The inverse quantizer 125 applies inverse quantizing to the blocks of quantized transform coefficients to generate blocks of transform coefficients. The inverse transform processor 126 inversely transforms the blocks of transform coefficients to generate blocks of MC residuals when the current picture is predictively coded, or blocks of pixel values when the current picture is coded without prediction.

Conventionally, the first picture in the group of pictures is coded without prediction. Thus, when the first frame of the predictively-coded block-based picture signal is decoded, the motion compensator 128 feeds no reference blocks to the input 130 of summing node 127, and the output of the summing node is identical to its input. The summing node outputs blocks of pixel values as blocks of the regenerated picture signal that represents a regenerated version of the first picture. The regenerated picture signal is stored in a page of the frame store 129. The frame of a picture signal that represents a regenerated version of the first picture is then read out from the page of the frame store.

When the second frame of the predictively-coded block-based picture signal is decoded, the entropy decoder 124 decodes the set of motion vectors that forms part of the second frame, and feeds the set of motion vectors to the motion compensator 128. Each of the motion vectors indicates a block of the regenerated picture signal stored in the frame store 129. The motion compensator 128 causes the frame store 129 to feed to it the blocks of the regenerated picture signal indicated by the motion vectors and uses these blocks to build the reference picture for decoding the second frame of the predictively-coded block-based picture signal. The reference picture is composed of one reference block for each block of the current picture.

When the decoder 120 decodes the second frame of the predictively-coded block-based picture signal, the motion compensator 128 feeds the reference block for each block of the current picture to the summing node 127. The summing node adds the reference block to the block of regenerated MC residuals output by the inverse transform processor 126 to generate a block of pixel values as a block of the regenerated picture signal that represents the second picture. The regenerated picture signal is stored in a page of the frame store 129 different from that in which is stored the regenerated picture signal that represents the first picture. The frame of a picture signal that represents a regenerated version of the second picture is then read out from the page of the frame store.

Processing similar to that just described is used to decode the frames of the predictively-coded block-based picture signal representing the remaining pictures in the group of pictures. The reference pictures for decoding the third and subsequent frames of the predictively-coded block-based picture signal may be generated from the regenerated picture signals stored in more than one of the pages of the frame store 129.

More detailed descriptions and analysis can be found in a number of sources, e.g., J. L. Mitchell, W. Pennebaker, C. Fogg and D. LeGall, MPEG Video Compression Standard, Chapman & Hall (1997). The techniques described above form the basis for a number of international standards for coding picture signals representing moving pictures. These standards include the MPEG-1, MPEG-2, CCITT H.261, and ITU H.263 moving picture coding standards.

The techniques described above for coding picture signals representing moving pictures involve block-based or overlapped block-based processing. Each picture is partitioned into blocks of pixels, which may overlap, and the corresponding blocks of pixel values are processed independently. Conventional block-DCT, lapped transform, and wavelet-based coding techniques for picture signals that represent moving pictures can be regarded as being block-based or overlapped block-based. Block-based coding is advantageous in that it provides acceptable performance and is architecturally simple to implement. However, block-based coding does not exploit, and in fact totally neglects, the actual content of the picture. In effect, block-based coding implicitly assumes that the original picture is composed of still or moving square blocks, which is unlikely in practice. Consequently, block-based coding imposes an artificial structure on the picture and then tries to code this structure.

Figure 2B:
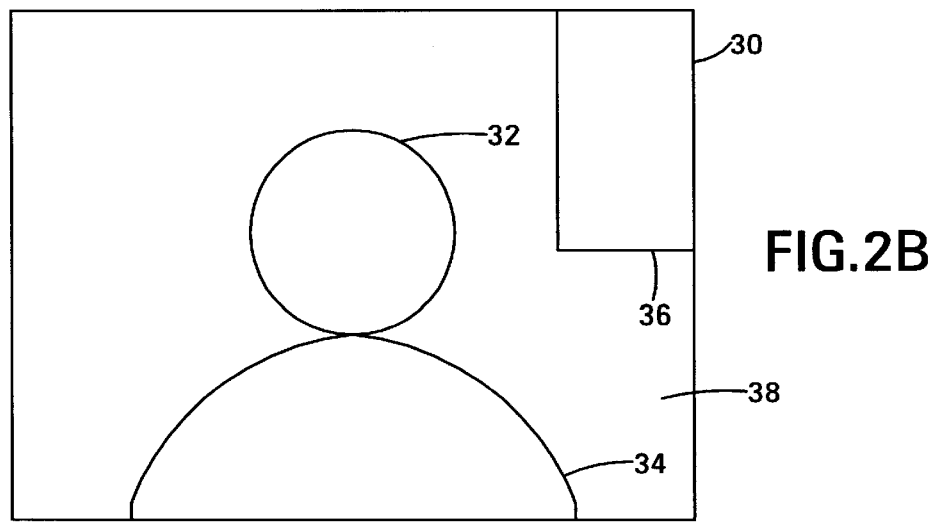
FIGS. 2B–2G illustrate the way in which the exemplary picture is encoded by an object-based encoder.

Object-based coding, on the other hand, recognizes the structure inherent in pictures and exploits this structure to increase the efficiency with which the picture signal representing a group of pictures is coded. For example, since pictures usually contain objects, the pictures may be represented in terms of two- or three-dimensional objects, which may be still or moving. This approach usually represents the actual structure of the pictures more accurately than the block-based coding schemes described above. FIG. 2B shows an example of an object-based representation of the picture shown in FIG. 2A. In this representation, the still picture 30 is decomposed into a number of two-dimensional objects or regions. In this example, the objects correspond to the person's head 32, the person's body 34, the window 36 and the background 38.

A moving picture composed of three-dimensional (3-D) objects can be decomposed into 3-D objects or regions in a number of different ways. One way identifies the 3-D objects in the scene and tracks each 3-D object with time. This approach is typically complex to implement. An alternative way identifies the 2-D objects or regions in a single picture at the start of the group of pictures, and tracks the evolution of the 2-D objects with time. A more practical way tracks the evolution with time of a signal representing a 2-D object, and specifically tracks how both the amplitude of the object and the shape of the object change with time.

Representing the picture 30 in terms of the objects it contains provides the ability to represent the picture in a more natural way. Moreover, and more importantly, representing the picture this way can provide new functionalities. For example, when a moving picture is represented by an object-based picture signal, the individual objects in the picture can be individually extracted and manipulated, and different processing can be applied to each. This facilitates interaction between the user and the picture.

An object-based representation of a picture also provides the ability to code the object-based picture signal with an improved coding efficiency. For example, object-based representation provides a highly-accurate definition of each object's shape and motion in a group of pictures. This can provide a significant gain in the performance of the MC-prediction. If the interior of an object has homogeneous characteristics, the homogeneity may be exploited to increase the efficiency with which the interior of the object is coded. Also, the artifacts that result from decoding a coded object-based picture signal may be less visible than the highly-structured and artificial blocking and mosquito noise artifacts that occur when a coded block-based picture signal is decoded.

Coding schemes for coding object-based picture signals are currently the topic of considerable research both within the general research community and within the MPEG-4 standardization process, see, for example, 7 IEEE TRANS. on Circuits and Systems for Video Technology: Special Issue on MPEG-4 (February 1997), and MPEG-4 OVERVIEW at http://drogo.stst.it/mpeg/standards/mpeg-4/mpeg-4.htm (March 1999).

While several different coding schemes for object-based picture signals may co-exist in the future, current standardization efforts are focused on the MPEG-4 standard. MPEG-4 defines a standard for coding object-based picture signals representing still and moving pictures. The attributes of the basic framework of the MPEG-4 standard can be summarized as follows. In a manner analogous to MPEG-1 and MPEG-2, the MPEG-4 standard only specifies the bit stream syntax of the coded picture signal and the characteristics of a standard decoder, and does not specify the encoder. For example, the standard does not define the way in which the encoder segments the picture signal into object descriptors representing the individual objects.

In the MPEG-4 standard, each picture in a group of pictures constituting all or part of a moving picture is expressed as a number of two-dimensional objects having arbitrary, i.e., non-rectangular, shapes. The objects are arranged in a scene. Any picture in the group of pictures may depict all of the scene, However, when the picture constitutes part of a moving picture, or when interactivity is provided, the picture will more likely depict only part of the scene. The object-based picture signal representing the group of pictures is composed of two main portions, a scene descriptor and one or more object descriptors. The scene descriptor lists the objects in the scene and describes how the objects are initially arranged in the scene. Each object in the scene is described by a respective object descriptor. Some groups of pictures may lack the scene descriptor and may instead use the same scene descriptor as an earlier group of pictures.

In a still picture, the object descriptor has two main components, a shape descriptor that defines the shape of the object and an amplitude descriptor that describes the amplitude of the object, i.e., the appearance of the object. For example, in the object-based picture 30 shown in FIG. 2B, the person's head 32 is represented by a shape descriptor and an amplitude descriptor.

In a moving picture, the object descriptor additionally includes a third component, namely, a motion descriptor that describes the motion of the object. Both the shape descriptor and the amplitude descriptor of an object can differ between consecutive pictures in a moving picture. All of the descriptors may be coded to reduce the number of bits required to represent them.

Figure 2C:
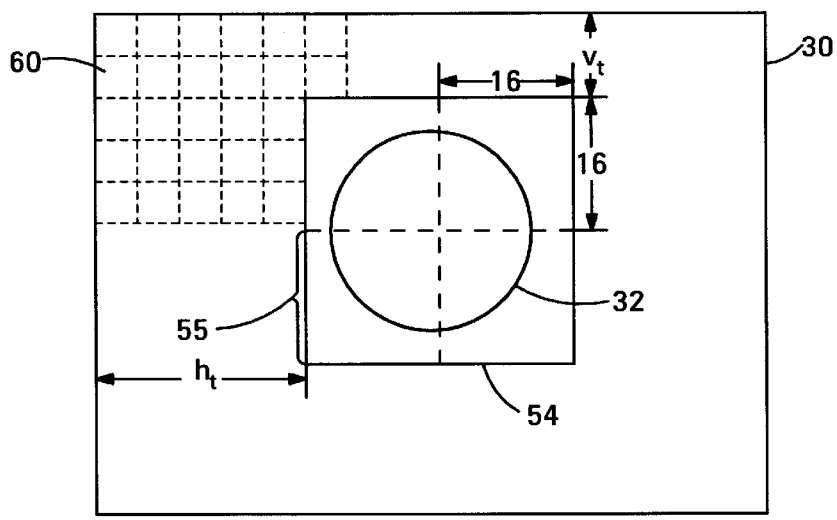

To simplify processing of an object-based picture signal, each arbitrarily-shaped object is placed in a bounding rectangle that has sides that are integral multiples of 16 pixels. FIG. 2C shows the bounding rectangle 54 of the person's head (head) 32 in the picture 30 shown in FIG. 2B. The other objects have been omitted from the picture to simplify the drawing. The shape descriptor and the amplitude descriptor of the head 32 are expressed in terms of the coordinate system of the bounding rectangle. The coordinate system of the bounding rectangle may be the same as, but is more often different from, the coordinate system of the picture. The position of the bounding rectangle in the picture is defined by a translation expressed in the coordinate system of the picture. The position in the picture of the origin of the bounding rectangle 54 is indicated by the horizontal and vertical coordinates, $h_t$, and $v_t$ in the coordinate system of the picture.

The blocks of the predictively-coded block-based picture signal that will be derived from the predictively-coded object-based picture signal are defined in the coordinate system of the picture 30. An exemplary block is shown at 60. Most of the blocks are omitted to simplify the drawing.

The shape descriptor of an object represents the shape of the object in terms of a mask that covers the bounding rectangle of the object. For example, the shape descriptor of the head 32 represents the shape of the head in terms of a mask that covers the bounding rectangle 54. The mask is a bitmap composed of an n-bit word for each object pixel. The type of mask depends on whether or not the object is opaque. The mask for an opaque object is a binary alpha mask in which n=1 and the state of each bit defines whether the corresponding object pixel is located inside or outside the support of the object. The support of an object is the region in which the object is defined, and may encompass one, two or three dimensions. In the MPEG-4 standard, each object is defined in two dimensions, so that the support of an MPEG-4 object is two-dimensional. The mask for a non-opaque object is a grey-scale alpha mask in which n>1. The value of the n-bit word for each object pixel is a multiplier that defines the attenuation of light that passes through the pixel. Outside the support of the object, each word has a value corresponding to zero.

The shape descriptor may be coded in a number of different ways. For example, the bounding rectangle may be partitioned into separate macroblocks of 16×16 pixels. Each macroblock is classified as an exterior macroblock, an interior macroblock or a boundary macroblock respectively located entirely outside, entirely inside, and part-inside and part-outside the support of the object. The exterior blocks are all transparent and the interior blocks are all opaque if the object is opaque, and can be efficiently coded as such. The boundary blocks are coded using a context-based arithmetic coder. In the example shown in FIG. 2C, all of the 16-pixel macroblocks, e.g., the macroblock 55, located in the bounding rectangle 54 are boundary blocks.

In a moving picture, the evolution of the object's shape descriptor from one picture to the next can be coded by applying motion compensation to the shape descriptor using a set of shape motion vectors and coding the error in predicting the shape using a context-based arithmetic coder with an appropriately-chosen context.

Figure 2D:
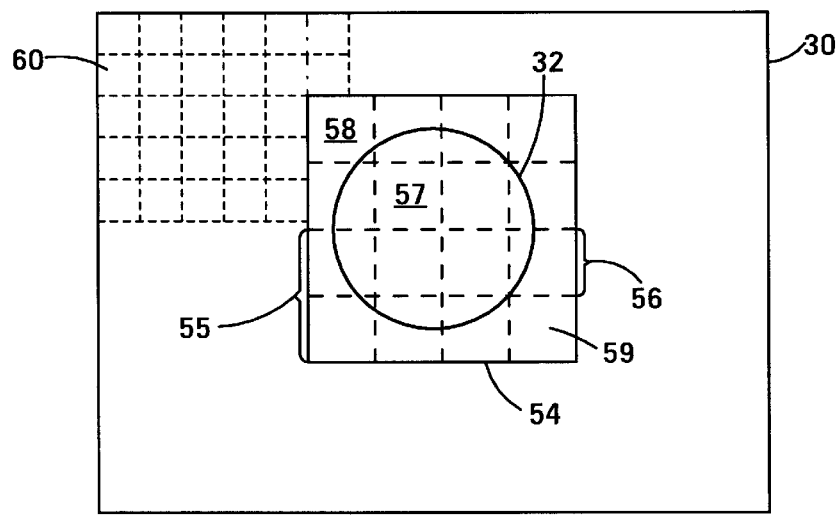

The amplitude descriptor of the object inside its support can be coded in a number of different ways. For example, the bounding rectangle 54 of the head 32 may be divided into blocks of 8×8 pixels, as shown in FIG. 2D, and the corresponding block of pixel values coded using a block-DCT. To distinguish the blocks into which the objects are divided in an object-based picture signal from the blocks into which the pictures are divided for block-based coding, the blocks into which the objects are divided will be called tiles. An exemplary tile is shown at 56. Interior tiles, which are tiles, such as the tile 57, located entirely inside the support of the object, may be conventionally coded using the block-DCT. Boundary tiles, such as the tile 58, may be coded in a number of ways. For example, the amplitude of the object inside the boundary tile may be first extrapolated to fill the tile. Then the tile may be coded using a block DCT. Alternatively, the boundary tiles may be coded using the so-called shape-adaptive DCT (SADCT). As further alternatives, the amplitude of the entire object may be coded with a wavelet or shape-adaptive wavelet transform (SAWT). Exterior tiles, such as the tile 59, are located entirely outside the support of the object and are not coded.

While the MPEG-4 standard allows the amplitude descriptor of an object to be coded in a number of different ways, it is likely that using block-DCT coding to code the interior and boundary tiles will be most prevalent in practice.

Figures 2E, 2F, 2G:
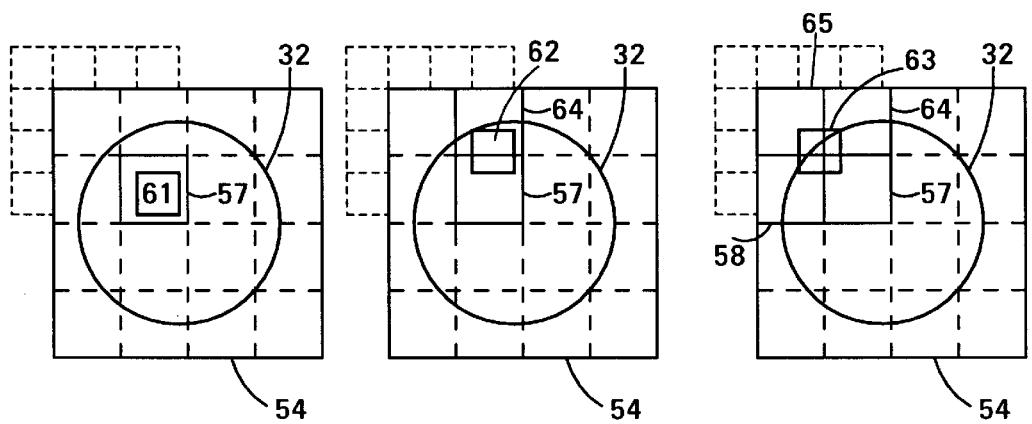

FIGS. 2E, 2F and 2G respectively show exemplary blocks 61, 62 and 63 into which the picture 30 is divided for block-based coding, and additionally show the tiles that appear in each block. In FIG. 2E, the interior tile 57 appears exclusively in block 61. In FIG. 2F, part of the interior tile 57 and part of the boundary tile 64 appear in block 62. In FIG. 2G, parts of the interior tile 57, the boundary tiles 58, 64 and 65 and one or more tiles (not shown) of the background 38 (FIG. 2B) appear in block 63. Thus, when the predictively-coded object-based picture signal representing the picture 30 is transcoded to generate the predictively-coded block-based picture signal representing this picture, block 61 is generated from the part of tile 57 that appears in it, block 62 is generated from the parts of tiles 57 and 64 that appear in it and block 63 is generated from the parts of tiles 57, 58, 64, 65 and the one or more tiles of the background that appear in it. The above tiles may be coded predictively or non-predictively in the object-based picture signal.

The evolution of the object's amplitude in a moving picture can be coded using motion-compensated prediction similar to that used to code a block-based picture signal. Motion-compensated prediction can be performed using block-based motion estimation or parametric motion estimation, which is more sophisticated. In an exemplary type of block-based motion estimation, the bounding rectangle is divided into macroblocks of 16×16 pixels and motion estimation is performed on each macroblock as a current block. The motion estimation identifies the macroblock that most closely matches the current block in the instance of the object that appears in a previously-coded picture. To improve the performance of the motion-compensated prediction, the instance of the object that appears in the previously-coded picture can be extrapolated to fill the bounding rectangle. Additional features may include the ability to switch from motion estimation using macroblocks of 16×16 pixels to motion estimation using blocks of 8×8 pixels, and may additionally include the ability to use overlapped-block motion compensated prediction.

Block-based motion estimation models treat the moving object as an array of moving square blocks in which the motion of each block is uniform translation throughout the block. Parametric motion estimation recognizes that the appearance of the object can change from one picture to the next in a way that is more complex than uniform translation. Such changes may include rotation, scaling, and perspective, in addition to translation. The parametric motion estimation capability of object-based coding such as MPEG-4 enables the motion of the object to be described using more sophisticated motion models, such as affine or perspective. In this case, the object in the previous picture is transformed using the appropriate motion model, interpolation to the sampling grid is performed, and then prediction is performed using the transformed object as the reference. Parametric motion models may be applied to the entire object, or the object may be partitioned into separate regions and an appropriate motion model may be applied to each region.

Parametric motion models may arise naturally in a number of cases. For example, when a moving picture is synthesized, using computer graphics for example, the change in an object from one picture to the next may be explicitly defined by a warping function. The warping function and its parameters may be communicated directly to the encoder or the encoder may estimate the warping function. In another example, in some sequences of moving pictures, the same background may be common to many pictures. However, the appearance of the background may change as the result of camera motion and occlusions by objects located between the camera and the background. In these cases, it can be beneficial to code the entire background, which is often called a sprite, and to transmit the picture signal portion representing the background only once at the beginning of the sequence. The picture-to-picture changes in the background are then coded using a motion model that takes account of the camera motion. Using the appropriate motion model can greatly increase the effectiveness of the motion compensated prediction, and, hence, the coding efficiency.

Figure 4A:
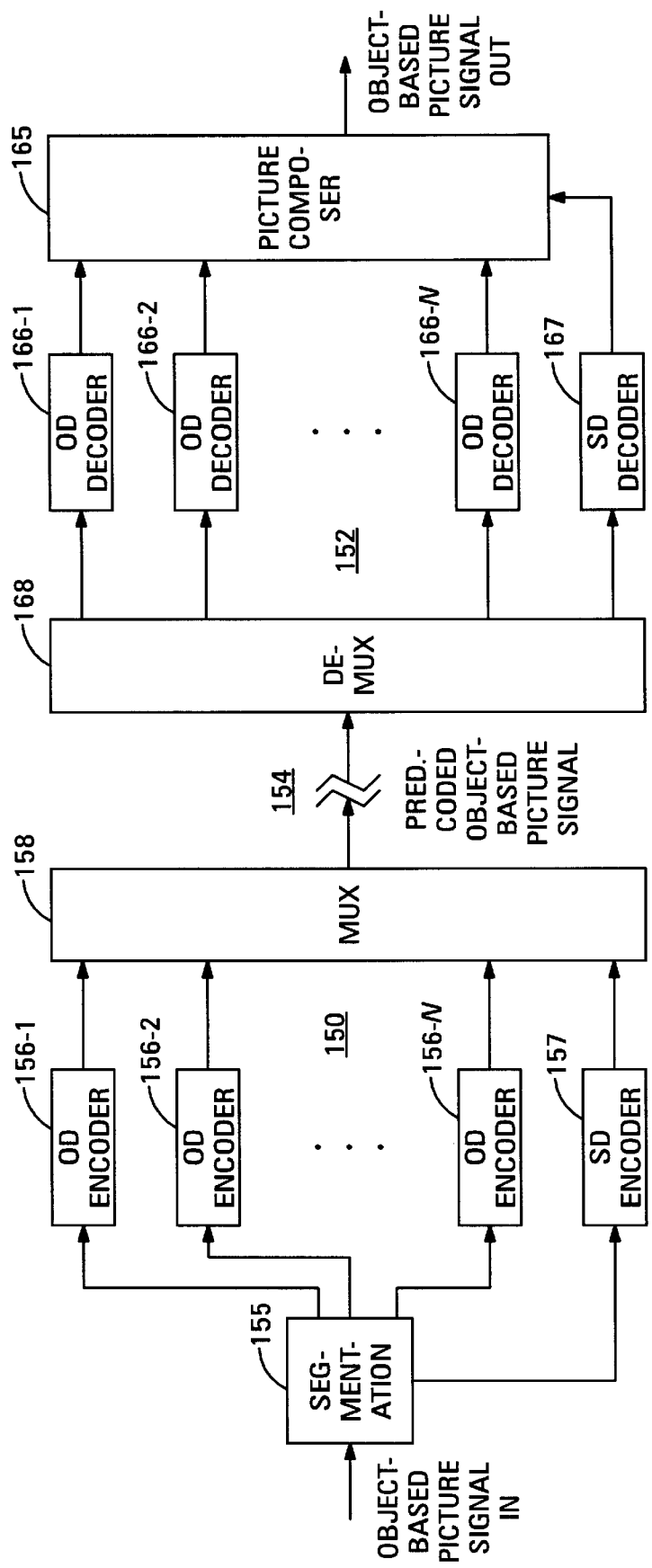
FIG. 4A is a block diagram of a system for encoding and decoding an object-based picture signal.

FIG. 4A is a block diagram showing the structure of a system for predictively coding an object-based picture signal and for decoding the coded object-based picture signal. The system is composed of the object-based encoder 150 and the object-based decoder 152 linked by the transmission/storage path 154. The object-based encoder is composed of the segmentation module 155, the N object descriptor encoders 156-1 to 156-N, the scene descriptor encoder 157 and the multiplexer 158. The object-based decoder is composed of the demultiplexer 168, the N object descriptor decoders 166-1 to 166-N, the scene descriptor decoder 167 and the picture composer 165 In the object-based encoder 150, the segmentation module 155 operates on the object-based picture signal to extract the scene descriptor and, in response to the scene descriptor, the object descriptor for each object identified by the scene descriptor. The segmentation module passes the object descriptor for each object to one of the object descriptor encoders 156-1 to 156-N and passes the scene descriptor to the scene descriptor encoder 157. The number of object descriptor encoders provided in a practical encoder depends on a trade-off between complexity and processing speed. When the number of objects in the scene exceeds the number of available object descriptor encoders, at least one of the object descriptor encoders is used more than once until the object descriptors for all the objects have been coded. An exemplary object descriptor encoder will be described below with reference to FIG. 4B.

The scene descriptor encoder 157 encodes the scene descriptor received from the segmentation module 155.

The coded object descriptors COD generated by the object descriptor encoders 156-1 to 156-N and the coded scene descriptor generated by the scene descriptor encoder 157 pass to the multiplexer 158, where they are multiplexed to generate a frame of a predictively-coded object-based picture signal. The multiplexer feeds the predictively-coded object-based picture signal to the transmission/storage path 154.

In the object-based decoder 152, the demultiplexer 168 receives each frame of the predictively-coded object-based picture signal from the signal transmission/storage path 154 and separates the predictively-coded object-based picture signal into a coded object descriptor for each object and a coded scene descriptor. The de-multiplexer feeds the coded scene descriptor to the scene descriptor decoder 167, which decodes the coded scene descriptor to generate a regenerated scene descriptor.

The demultiplexer 168 additionally feeds the coded object descriptor for each object to one of the object descriptor decoders 166-1 to 166-N. Each object descriptor decoder decodes the coded object descriptor of one object, or, operating serially, of more than one object, to generate a respective regenerated object descriptor. The number of object descriptor decoders provided in a practical decoder depends on a trade-off between complexity and processing speed. When the number of objects in the scene exceeds the number of object descriptor decoders, at least one of the object descriptor decoders is used more than once until the object descriptors for all the objects have been decoded. An exemplary object descriptor decoder will be described below with reference to FIG. 4C.

The object descriptor decoders 166-1 to 166-N feed the regenerated object descriptors to the picture composer 165. The scene descriptor decoder 167 feeds the regenerated scene descriptor to the picture composer. The picture composer arranges the regenerated object descriptors of the objects in accordance with the regenerated scene descriptor to generate a regenerated version of the current picture.

Figure 4B:
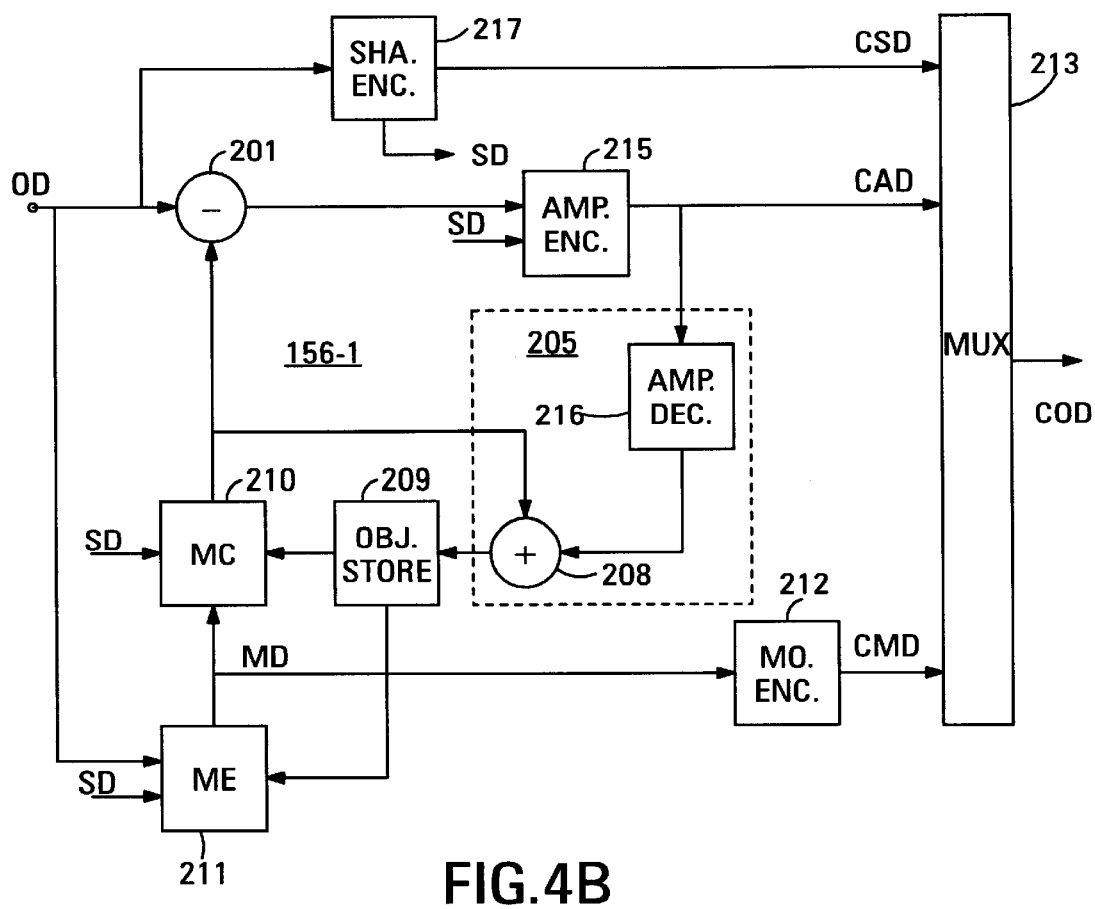
FIG. 4B is a block diagram showing the structure of an exemplary object descriptor encoder in the system shown in FIG. 4A.

FIG. 4B shows the internal structure of the exemplary object descriptor encoder 156-1 shown in FIG. 4A. The other object descriptor decoders are similarly structured. The object descriptor encoder is based on the conventional block-based encoder 100 shown in FIG. 3A, but additionally includes the shape encoder 217. Elements of the object descriptor encoder that correspond to elements of the block-based encoder 100 are indicated using the same reference numerals with 100 added. The object descriptor encoder 156-1 receives the object descriptor, which is composed of an amplitude descriptor, a shape descriptor and a motion descriptor. The object descriptor encoder uses motion-compensated prediction to predict the amplitude descriptor of the instance of the object in the current picture from the amplitude descriptors of one or more previously-coded instances of the object. The amplitude descriptors of the previously-coded instances of the object have been decoded by the local decoder 205 and have been stored in the object store 209. The subtraction node 201 determines the errors in the prediction of the amplitude descriptor, and the transform coder 215 codes the prediction errors.

The main difference between the object descriptor encoder 156-1 and the conventional block-based encoder 100 shown in FIG. 3A is that the object can have any arbitrary, non-square shape. Therefore, the object's shape descriptor is separated from its amplitude descriptor and motion descriptor, and is coded by the shape encoder 217. The resulting coded shape descriptor CSD is fed to the multiplexer 213, where it is multiplexed with the object's coded amplitude descriptor CAD and coded motion descriptor CMD to generate the coded object descriptor COD of the object.

The object's shape descriptor, indicated as SD, is also fed to the amplitude encoder 215, the motion compensator 210 and the motion estimator 211, where it is used in the operations performed by these modules. The example of the object descriptor encoder 156-1 shown codes the object's amplitude descriptor using block-based coding techniques, i.e., block-based motion estimation and motion compensation and block-DCT. Alternatively, the object descriptor encoder may use coding techniques specifically designed for arbitrary, non-square shapes.

Figure 4C:
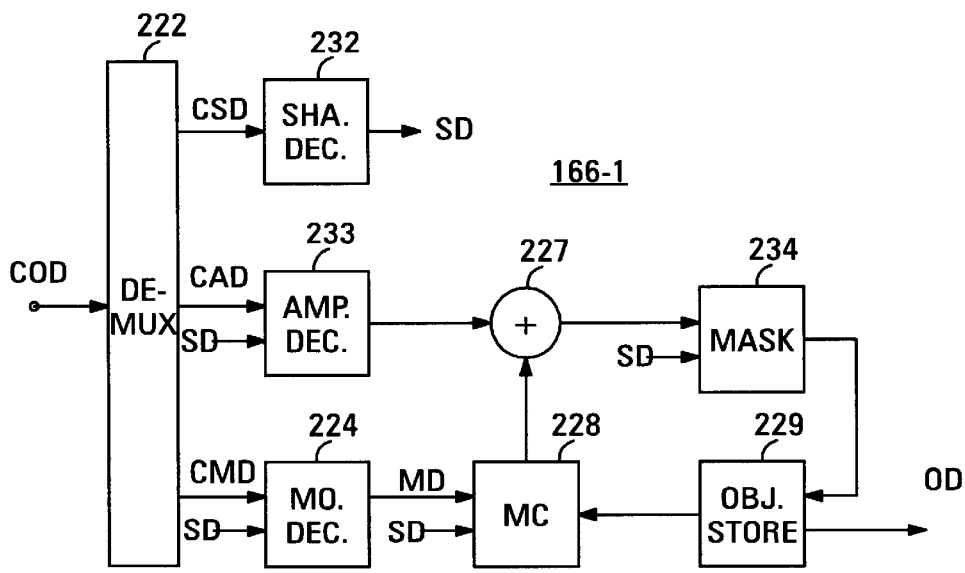
FIG. 4C is a block diagram showing the structure of an exemplary object descriptor decoder in the system shown in FIG. 4A.

FIG. 4C shows the structure of the exemplary object descriptor decoder 166-1 shown in FIG. 4A. The object descriptor decoder is based on the conventional block-based decoder 120 shown in FIG. 3B, but additionally includes the shape decoder 232 and the mask processor 234. Elements of the object descriptor decoder 166-1 that correspond to the block-based decoder 120 are indicated using the same reference numerals with 100 added.

In the object descriptor decoder 166-1, the demultiplexer 222 receives the coded object descriptor COD of an object and divides the coded object descriptor into a coded shape descriptor CSD, a coded amplitude descriptor CAD and a coded motion descriptor CMD for the object. The demultiplexer feeds the coded shape descriptor to the shape decoder 232. The shape decoder decodes the coded shape descriptor to generate the regenerated shape descriptor SD, and feeds the regenerated shape descriptor to the amplitude decoder 233, the motion decoder 224, the motion compensator 228 and the mask processor 234.

The demultiplexer feeds the coded motion descriptor to the motion decoder 224. The motion decoder decodes the coded motion descriptor to generate the regenerated motion descriptor, and feeds the regenerated motion descriptor to the motion compensator 228. The regenerated motion descriptor may be composed of a motion vector for each tile into which the object is divided, for example. In response to the regenerated motion descriptor, the motion compensator selects portions of one or more of the regenerated instances of the object stored in the object store 229, warps them and interpolates them to the sampling grid and feeds them to the summing node 227.

The demultiplexer feeds the coded amplitude descriptor to the amplitude decoder 233. For the instance of an object in most pictures, the coded amplitude descriptor is composed of coded motion compensation prediction errors. The amplitude decoder decodes the coded amplitude descriptor to generate a decoded amplitude descriptor. Again, for the instance of an object in most pictures, the decoded amplitude descriptor is composed of amplitude description prediction errors. The amplitude descriptor feeds the decoded amplitude descriptor to the summing node 227. The summing node sums the decoded amplitude descriptor with one or more previously-coded instances of the object output by the motion compensator, and feeds the resulting unmasked regenerated object descriptor to the mask processor 234.

The mask processor 234 performs a masking operation on the unmasked regenerated object descriptor using the regenerated shape descriptor SD. The resulting regenerated object descriptor is stored in the object store 229. The regenerated object descriptor OD is read out from the object store.

A block-based encoder, such as an MPEG-2 encoder, generates a predictively-coded block-based picture signal that represents a group of pictures in which the frames of the picture signal representing most of the pictures are predictively coded using a reference picture derived from one or more previously-coded pictures. An object-based encoder, such as an MPEG-4 encoder, generates a picture signal that includes a number of object descriptors each representing an object. Each object is predictively coded using a reference derived from one or more previously-coded instances of itself. A block-based encoder can be thought of as being picture-oriented because it operates using a single prediction loop that applies to the entire picture. Moreover, a block-based encoder encodes only what is displayed in each picture. An object-based encoder, on the other hand, is object-based. The encoder encodes each object separately, and operates using multiple prediction loops, one for each object. After the object-based decoder has decoded the coded object descriptors for all the objects that appear in the scene, it composes the object descriptors to form the picture for display. However, not all of the objects whose object descriptors are decoded need be displayed in any given picture. What actually appears in the picture as displayed is determined by the picture composition process.

In U.S. patent application Ser. No. 09/409,935, assigned to the assignee of this disclosure and incorporated herein by reference, one of the inventors (Apostolopoulos) discloses a transcoding method and transcoder for transcoding coded picture signals from object-based coding to block-based coding. The transcoding method and transcoder operate on coded picture signals representing still pictures, or coded picture signals representing moving pictures in which all the pictures are coded without prediction.

The present disclosure describes a transcoding method and a transcoder for transcoding a predictively-coded object-based picture signal to a predictively-coded block-based picture signal. The predictively-coded object-based picture signal represents a group of pictures in which the object descriptors of at least one of the objects are predictively coded. The predictively-coded block-based picture signal represents the group of pictures in which most of the pictures are predictively coded. Transcoding a predictively-coded object-based picture signal to a predictively-coded block-based picture signal is substantially more difficult than transcoding non-predictively coded picture signals representing still pictures, or independently-coded moving pictures, from object-based coding to block-based coding. This is because of the temporal characteristics of object-based picture signals representing moving pictures and the temporal dependencies introduced by the prediction coding.

The temporal dependencies resulting from prediction coding make it more difficult to determine what measures can be used to reduce the processing required to effect the transcoding. For example, when transcoding a picture signal that represents a still picture containing an object whose bottom half is not visible in the picture, it is not necessary to transcode the portion of the picture signal that represents the bottom half of the object. This is because the bottom half of the object is not visible in the picture. Not transcoding the signal portion that represents the bottom part of the object reduces the processing resources needed to transcode the picture signal. When the picture just described is the first picture in a group of pictures constituting at least part of a moving picture, and the picture signal representing the entire group of pictures is to be transcoded, the picture signal portion representing the bottom half of the above-mentioned object may have to be transcoded, even though the bottom half of the object is not visible in the first picture. The picture signal portion representing the bottom half of the object will have to be transcoded if the bottom half of the object comes into view in a later picture, and the bottom half of the object in the later picture is predictively coded using the bottom half of the object appearing in the first picture as a reference. More generally, the picture signal portion representing any non-visible portion of an object will have to be transcoded if the non-visible portion of the object is later used as a reference for predictively coding another picture.

In many applications, the objects and portions of objects that will be needed later for predicting parts of pictures that will be coded after the current picture cannot be determined by examining the portion of the coded picture signal that represents the current picture and the pictures that have been coded before the current picture. However, in some applications, this determination can sometimes be made using the scene descriptor. When such a determination can be made, it can be used to control the transcoding of the coded picture signal portion representing the current picture so that only those portions of the current picture are transcoded that are required to generate the current picture and to code pictures that will be coded after the current picture. This can save processing resources.

Some applications provide the ability to look ahead of the current picture to determine what portions of the coded picture signal portion representing the current picture need to be transcoded to generate the current picture and for use in coding pictures that will be coded afer the current picture. This ability exists when the coded picture signal, or the coded picture signal portion representing the current group of pictures, can be examined before being transcoded. This occurs when, for example, the coded picture signal is stored before it is transcoded. The ability to look ahead potentially provides a significant reduction in processing complexity.

The invention reduces the processing resources required to transcode a predictively-coded object-based picture signal to a predictively-coded block-based picture signal by applying one or more of the following techniques:

1. Selectively decoding visible objects, so that only the predictively-coded object-based picture signal portions that represent objects that are actually visible or that are used to predict visible objects in later-coded pictures are decoded;
2. Using the motion information that forms part of the predictively-coded object-based picture signal to assist in efficiently estimating the motion vectors for predictively coding the block-based picture signal;
3. Performing the transcoding processing in a coding domain, such as the subsampled YUV domain, having a higher coding state than the RGB domain;
4. Exploiting sprite or background object characteristics; and
5. Using DCT-domain processing, such as inverse MC-prediction.

Figure 5:
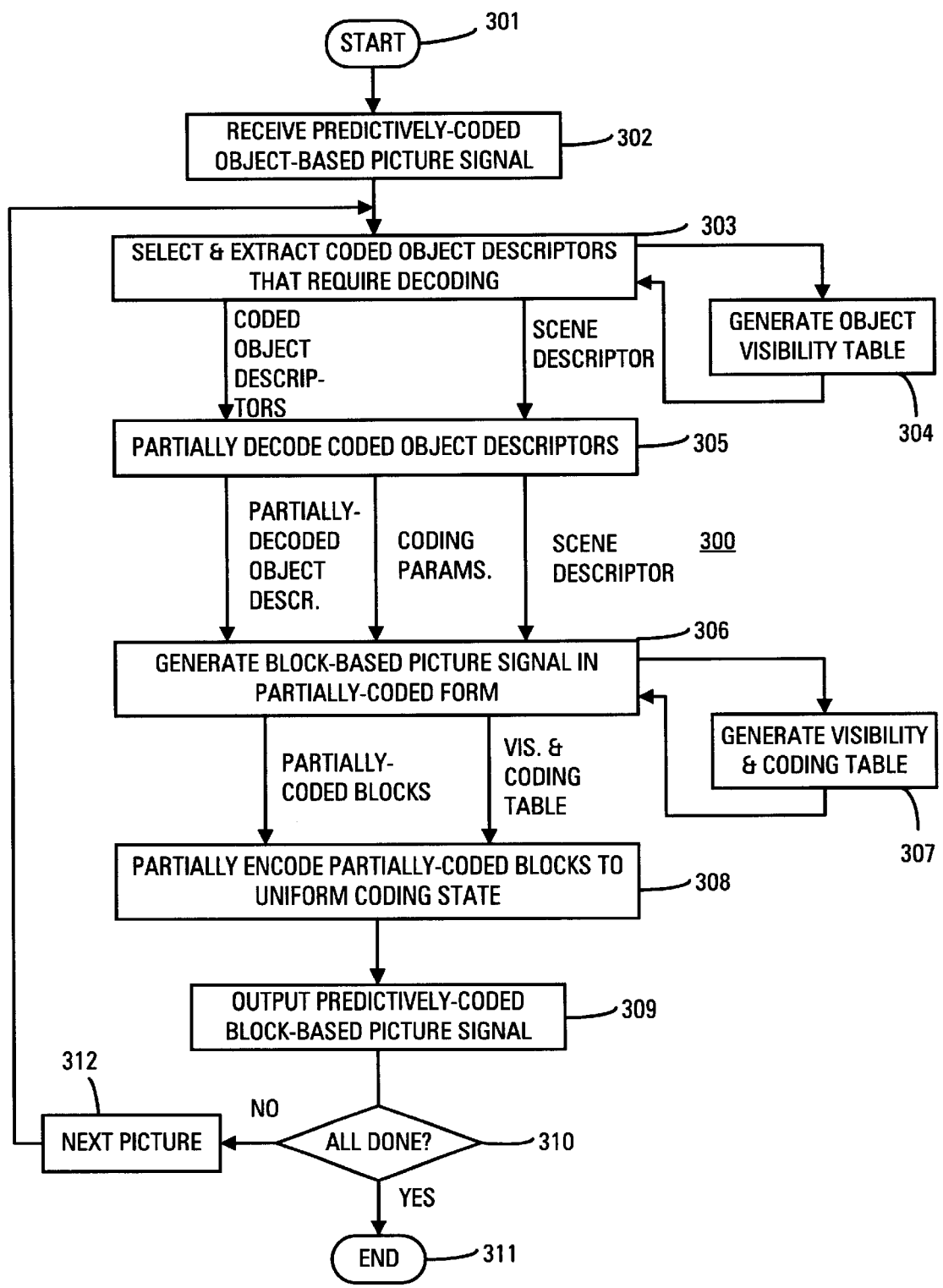
FIG. 5 is a flow chart illustrating the transcoding method according to the invention.

FIG. 5 is a flow chart illustrating the transcoding method 300 according to the invention. The method 300 is performed when the current picture is predictively coded. When the current picture is independently coded, the transcoding method described in the above-mentioned U.S. patent application Ser. No. 09/409,935 is employed instead.

Execution begins at process 301.

In process 302, a predictively-coded object-based picture signal, such as an MPEG-4 picture signal, representing a group of pictures is received.

In process 303, the scene descriptor is extracted from the frame of the object-based picture signal that represents the current picture and is decoded. The objects or portions of objects described by the decoded scene descriptor whose coded object descriptors need to be partially decoded to transcode the current picture are then determined. Process 303 preferably includes process 304 in which an object visibility table is generated in response to the decoded scene descriptor. In its simplest form, the object visibility table includes, for each object described by the scene descriptor, an entry that indicates whether the coded object descriptor of the object requires decoding. The coded object descriptor of an object requires decoding when the object is wholly or partly visible in the current picture or when at least part of the object serves as a reference for coding one or more instances of the object appearing in later pictures in the group of pictures. In a form that provides a greater transcoding efficiency, the object visibility table includes, for each tile or macroblock of each object described by the scene descriptor, an entry that indicates whether the portion of the coded object descriptor that represents the tile or macroblock requires decoding. The portion of the coded object descriptor that represents a tile or macroblock of an object requires decoding when the tile or macroblock is wholly or partly visible in the current picture or when at least part of the tile or macroblock serves as a reference for coding all or part of one or more instances of the object appearing in later pictures in the group of pictures. In relation to the transcoding method according to the invention, references to a coded object descriptor will be understood to encompass a portion of a coded object descriptor when such portion of such coded object descriptor is determined to require decoding.

Then, in process 303, the coded object descriptors determined to require decoding are extracted from the object-based picture signal. The object visibility table is preferably used to indicate the coded object descriptors that are to be extracted. Process 303 passes the scene descriptor and the extracted coded object descriptors to the next process 305. Alternatively, all the coded object descriptors may be extracted from the object-based picture signal and passed to the next process together with the object visibility table.

In process 305, the coded object descriptors extracted from the object-based picture signal are partially decoded to generate respective partially-decoded object descriptors. When all the coded object descriptors are extracted from the object-based picture signal, only those of the coded object descriptors indicated by the object visibility table, or otherwise, as requiring decoding are partially decoded. The partial decoding processing applied to each coded object descriptor extracts coding parameters that describe the predictive coding applied to the coded object descriptor. The coding parameters include the motion information obtained by decoding the coded motion descriptor included in each object descriptor. Process 305 passes the scene descriptor, and the partially-decoded object descriptors and their respective coding parameters, to the next process 306.

In process 306, the current picture is divided into blocks for block-based coding, and the scene descriptor is used to identify each tile that appears in each of the blocks. One or more tiles of one or more objects may appear in any given block. Shift, mask and merge operations are applied to the portion of the partially-decoded object descriptor representing each identified tile to generate the corresponding block of a partially-coded block-based picture signal that represents the current picture. The block of the partially-coded block-based picture signal is generated in a partially-coded state. Process 306 passes the blocks of the partially-coded block-based picture signal and the visibility and coding table to the next process 308.

Process 306 includes process 307, which generates a visibility and coding table for the current picture. The visibility and coding table identifies, for each block into which the current picture is divided for block-based coding, each object that appears in the block, the tiles of each object that appears in the block and the coding parameters of each tile. Process 307 passes the visibility and coding table for the current picture back to process 306.

Process 306 passes the blocks of the partially-coded block-based picture signal and the visibility and coding table to the next process 308.

In process 308, the information included in the visibility and coding table is used to adaptively and intelligently encode the blocks of the partially-coded block-based picture signal that represents the current picture to generate a frame of a predictively-coded block-based picture signal, such as an MPEG-2 picture signal, that represents the current picture and has a uniform coding state. The partial encoding operation applies predictive coding to most of the blocks. The processing resources required by the partial encoder are substantially reduced by deriving motion vectors for predictively coding as many of the blocks as possible from the motion descriptors included in the visibility and coding table.

In process 309, the frame of the predictively-coded block-based picture signal representing the current picture is output.

In process 310, a test is performed to determine whether all the pictures in the group of pictures have been transcoded. When the test result is YES, execution advances to process 311, where it ends. When the test result is NO, execution returns to process 303 via process 312 to process the next picture.

Figure 6A:
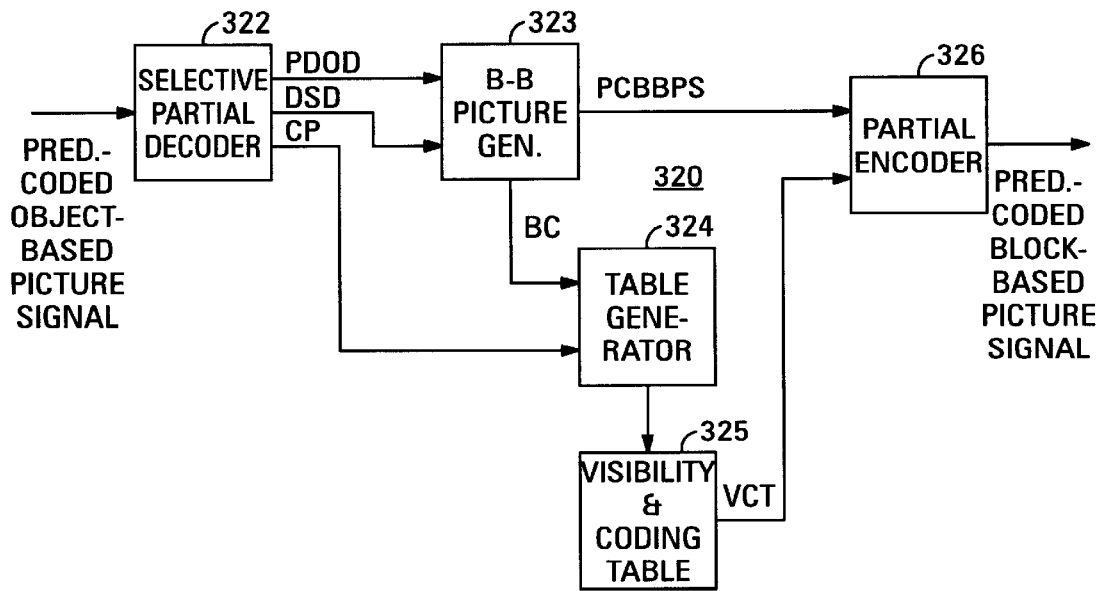
FIG. 6A is a block diagram of a transcoder according to the invention.

FIG. 6A is a block diagram illustrating the transcoder 320 according to the invention. The transcoder 320 is used when the current picture is predictively coded. When the current picture is independently coded (an I-picture), the transcoder described in the above-mentioned U.S. patent application Ser. No. 09/409,935 is employed instead.

The transcoder 320 is composed of the selective partial decoder 322, the block-based picture generator 323, the table generator 324, the visibility and coding table 325 and the partial encoder 326.

The selective partial decoder 322 has a structure similar to the object-based decoder 152 shown in FIG. 4A, and will be described in more detail below with reference to FIG. 6B. However, the selective partial decoder differs from the object-based decoder 152 in that (a) the selective partial decoder decodes the coded object descriptors only to the extent that allows blocks of the block-based picture signal to be generated from them, and (b) the selective partial decoder preferably decodes the coded object descriptors of only those of the objects or parts of objects that require decoding. The object-based decoder 152 decodes all of the coded object descriptors to generate blocks of RGB pixel values. The selective partial decoder 322 subjects the coded object descriptors to less decoding than this, and can decode the coded object descriptors to blocks of YUV pixel values, to blocks of DCT coefficients or to sets of run-length coded DCT coefficients. Under specific circumstances, the selective partial decoder may subject some coded object descriptors to no decoding.

The selective partial decoder 322 receives a predictively-coded object-based picture signal, such as an MPEG-4 picture signal, that represents a group of pictures. The selective partial decoder extracts and decodes the coded scene descriptor. In response to the decoded scene descriptor, the selective partial decoder determines which of the objects described by the scene descriptor have coded object descriptors that require decoding. Such objects are those that are visible in the current picture, or are used to predict objects or parts of objects that appear in any later-coded picture in the group of pictures. Alternatively, only portions of the coded object descriptors may be extracted, as described above. In relation to the transcoder according to the invention, references to a coded object descriptor will be understood to encompass a portion of a coded object descriptor when such portion of such coded object descriptor is determined to require decoding. The selective partial decoder then extracts the coded object descriptors of the objects or object portions determined to require decoding from the corresponding frame of the object-based picture signal.

The selective partial decoder 322 additionally partially decodes the coded object descriptors determined to require decoding. Decoding each coded object descriptor generates a respective partially-decoded object descriptor. The selective partial decoder forwards the decoded scene descriptor DSD for each picture and each partially-decoded object descriptor PDOD to the block-based picture generator 323.

In the course of decoding the coded object descriptors, the selective partial decoder recovers coding parameters that include the motion information obtained by decoding the coded motion descriptor of each of the objects, and information indicating the coding state to which the object descriptor has been decoded. The selective partial decoder forwards the coding parameters CP to the table generator 324.

The block-based picture generator 323 divides the current picture into blocks for block-based coding, and operates in response to the decoded scene descriptor DSD to identify each tile that appears in each of the blocks. One or more tiles of one or more of the objects represented by the partially-decoded object descriptors PDOD may appear in any given block. The block-based picture generator then applies shift, mask and merge operations to the identified tiles to construct each block of the block-based picture signal representing the current picture. The block-based picture generator forwards the blocks of the partially-coded block-based picture signal PCBBPS that represents the current picture to the partial encoder 326. The block-based picture generator additionally forwards to the table generator 324 the block content information BC it generates in the course of composing the current picture. The block content information indicates each tile of each object that appears in each block of the current picture.

The table generator 324 generates the entries that are stored in the visibility and coding table 325. A visibility and coding table is created for the current picture. The visibility and coding table may be composed of multiple pages that store the visibility and coding tables created for a number of pictures coded before the current picture. The visibility and coding table preferably includes an entry for each block into which the current picture is divided for block-based coding. The entry includes the block content information BC that identifies the objects that appear in the block, and additionally includes the coding parameters for each of the objects. The block content information preferably additionally identifies the tiles of each object that appears in the block and includes coding parameters for each tile. The visibility and coding table for the current picture is fed to the partial encoder 326.

The partial encoder 326 receives and uses the information included in the visibility and coding table 325 to adaptively and intelligently partially encode the blocks of the partially-coded block-based picture signal to generate blocks that collectively constitute a predictively-coded block-based picture signal that represents the current picture. The partial encoder encodes each block of the partially-coded block-based picture signal such that, after coding, all blocks of the predictively-coded block-based picture signal are in the same coding state. Each block is preferably coded with prediction coding using a motion vector derived from the motion descriptor of at least one of the objects that appear in the block.

The partial encoder 326 is structured similarly to the block-based encoder 100 shown in FIG. 3A and will be described in more detail below with reference to FIG. 6C. The partial encoder 326 uses substantially fewer processing resources than the block-based encoder 100. This is for two reasons. First, the blocks of the current picture received from the block-based picture generator 323 are partially coded, so the partial encoder has to perform less coding processing to encode the blocks to their fully-coded state. Second, when the current picture is predictively coded, as is normal for all but the first picture in the group of pictures, as many of the blocks of the partially-coded block-based picture signal as possible are predictively coded using a motion vector derived from the motion information included in the blocks' respective entries in the visibility and coding table 325. Consequently, the partial encoder does not perform a computationally-intensive motion estimation operation for most of the blocks of the current picture.

Each block of the partially-coded block-based picture signal coded by the partial encoder 326 is output as a block of the predictively-coded block-based picture signal. The predictively-coded block-based picture signal is composed of blocks of quantized DCT coefficients. The transcoder 320 can additionally include an entropy coding module (not shown) that applies entropy coding to the blocks of quantized DCT coefficients and an output buffer (not shown) that organizes the entropy-coded blocks into a predictively-coded block-based picture signal that is compliant with a standard decoder, such as a standard MPEG-2 decoder. The output buffer can generate a feedback signal for controlling quantizing applied by the partial encoder so that the bit rate of the predictively-coded block-based picture signal complies with a pre-determined bit-rate requirement or a standard input buffer constraint.

The processing performed in processes 303 and 304 of the transcoding method 300 and by the de-multiplexer 268 and the object visibility table 265 (FIG. 6B) that form part of the selective partial decoder 322 of the transcoder 320 will now be described in further detail. This processing extracts the coded scene descriptor for each picture from the predictively-coded object-based picture signal, decodes the coded scene descriptor and determines from the scene descriptor whether each object described by the scene descriptor is visible at least in part in the current picture. The scene descriptor includes information such as object location in space and time and object visibility. In addition, the processing also identifies objects that are not visible in the current picture but whose coded object descriptors must still be decoded because an instance of the object that is visible in a later-coded picture in the group of pictures has been predictively coded at least in part using the instance of the object in the current picture as reference. This determination may be made by performing a look-ahead operation to determine which objects and object portions are visible in the later-coded pictures in the group of pictures, and the dependencies between such objects and the objects identified by the scene descriptor of the current picture.

Making the determination just described avoids wasting processing resources on decoding the object descriptors of objects or object portions that are neither visible in the current picture nor are required later to decode instances of the object appearing in later-coded pictures. The scene descriptor may describe objects that are not visible in any picture in the group of pictures. The object-based picture signal may include object descriptors for objects that are only accessed via interactive features, for example. The scene descriptor may also describe a scene that is larger than the scene displayed in any of the pictures in the group of pictures. For example, the scene descriptor may describe a panorama composed of many objects, but the pictures constituting the group of pictures may collectively show only a selected part of the panorama and a subset of the objects.

In some applications, such as those in which the transcoder 320 operates in real time, it is difficult or impractical to determine whether to decode the object descriptors of objects that are not visible in the current picture to enable an instance of the object that appears in a later-coded picture to be decoded. In this case, the conservative but more resource-demanding approach is to extract and decode the entire object descriptor of every object.

In applications in which the object-based picture signal, or at least the portion of the picture signal representing the current group of pictures, is stored and available, the object descriptors that require partial decoding can be determined in a number of different ways. For example, a look-ahead operation can be performed to identify the non-visible objects will be needed to decode instances of the objects appearing in a later-coded picture in the group of pictures. As an alternative to identifying an entire object, only the parts of the object that are (a) visible in the current picture, and (b) hidden in the current picture but necessary for decoding an instance of the object appearing in a later-coded picture, may be identified.

Another technique is to decode only the objects visible in the current picture, and to cache the undecoded coded object descriptors of the remaining objects. Then, the coded object descriptors of any objects later identified as requiring decoding can be decoded by backtracking to the cache of undecoded object descriptors for the current picture. A further alternative identifies only the portions of the objects visible in the current picture, and caches the undecoded object descriptors and portions of object descriptors. The alternative backtracks to the current picture to decode the object descriptors of non-visible object portions that are later found to require decoding.

In a preferred embodiment, the scene descriptor is used to build an object visibility table for the current picture. As noted above, the object visibility table indicates whether each object described by the scene descriptor is visible in the current picture. Preferably, the object visibility table indicates whether each tile or macroblock of each object described by the scene descriptor is visible in the current picture. Where a look-ahead capability exists, the object visibility table preferably additionally indicates the objects, macroblocks or tiles that additionally require decoding to decode instances of the object that appear in a later-coded picture in the group of pictures, as described above.

The processing performed in process 305 of the transcoding method 300 and by the selective partial decoder 322 of the transcoder 320 will now be described in further detail. The coded object descriptor of each object determined in process 303 as being visible in the current picture, or, optionally, determined as being necessary for decoding an instance of the object appearing in a later-coded picture, is decoded only to the extent that enables the decoded object descriptor to be used to generate one of more blocks of the block-based picture signal. The object descriptors can usually be only partially decoded because it is typically unnecessary to decode them all the way to RGB pixel values. For example, a substantial majority of the object descriptors need only be partially decoded to the extent that yields blocks of DCT coefficients or to the extent that yields blocks of subsampled YUV pixel values.

In addition, as each object descriptor is partially decoded, coding parameters are extracted from the object descriptor. The coding parameters include motion information obtained by decoding the motion descriptor that forms part of the object descriptor. The coding parameters are later used to increase the efficiency and accuracy of the predictive coding performed in process 308 and by the partial encoder 326, as will be described below. The coding parameters include an intra/inter coding decision for each object, or tiles thereof, motion information such as motion vectors or parametric motion field descriptions, quantizing parameters, coded bit rate and an indicator of the coding state to which the object descriptor has been partially decoded.

Figure 6B:
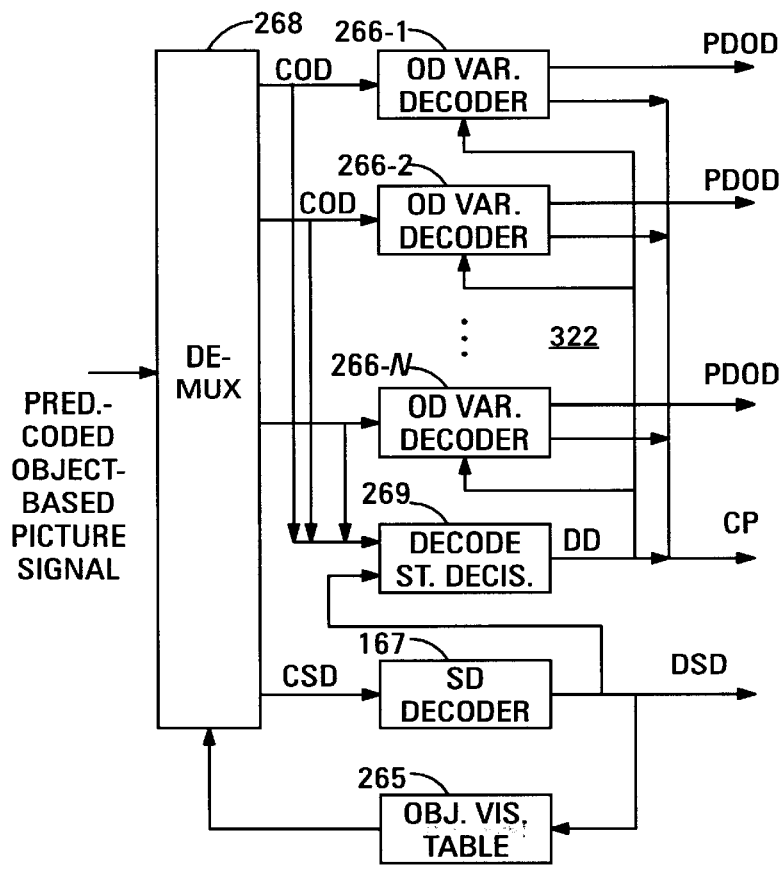
FIG. 6B is a block diagram showing the structure of the selective partial decoder of the transcoder shown in FIG. 6A.

FIG. 6B shows an example of the structure of the selective partial decoder 322 shown in FIG. 6A. The selective partial decoder 322 is similar in structure to the object-based decoder 152 shown in FIG. 4A. Elements of the selective partial decoder 322 that correspond to elements of the decoder 152 are indicated using the same reference numerals and will not be described further.

The selective partial decoder 322 includes the object visibility table 265. The object visibility table is constructed in response to the decoded scene descriptor DSD generated by the scene descriptor decoder 167. The object visibility table is otherwise described above, and will not be described further here.

The de-multiplexer 268 operates in response to the object visibility table 265 to extract from the current frame of the object-based picture signal only the coded object descriptors indicated in the object visibility table as requiring decoding. The de-multiplexer 268 feeds the indicated coded object descriptors COD to the object descriptor variable decoders 266-1 to 266-N. When the object visibility table is structured to indicate the tiles or macroblocks of the objects whose coded object descriptor portions require decoding, the de-multiplexer feeds the coded object descriptor portions COD to the object descriptor variable decoders instead of the entire coded object descriptors to reduce the amount of decoding processing required. In the remainder of the description of the selective partial decoder 322, references to a coded object descriptor will be understood to encompass a portion of a coded object descriptor when such portion of such coded object descriptor is indicated to require decoding.

Each of the object descriptor variable decoders 266-1 to 266-N is structured to decode all or part of the coded object descriptor COD of an object to a decoding state determined by a control signal received from the decoding state decision module 269. The object descriptor decoders 166-1 to 166-N shown in FIG. 4A decode the object descriptor of an object to a fully-decoded state in which the object is represented by tiles of RGB pixel values. In a preferred embodiment of the selective partial decoder 322, each object descriptor variable decoder partially decodes the coded object descriptor of an object to one of a number of different states of partial decoding in which the object descriptor remains partially coded. The partially-decoded object descriptor may be composed of, for example, tiles of subsampled YUV pixel values, tiles of DCT coefficients and sets of run-length coded DCT coefficients, depending on the decoding state. Moreover, for some objects, the partially-coded object descriptor may have the same decoding state as the coded object descriptor.

Partially decoding the coded object descriptors in the predictively-coded object-based picture signal to tiles of subsampled YUV pixel values saves substantial processing resources compared with fully decoding the coded object descriptors to tiles of RGB pixel values. This is because no upsample/filter operations and YUV-to-RGB matrix conversion operations need be performed in decoding the coded object descriptors, and no RGB-to-YUV matrix conversion operations and filter/downsample operations need be performed in coding the partially-coded block-based picture signal.

In addition to partially decoding the coded object descriptors it receives, each of the object descriptor variable decoders 266-1 to 266-N is configured to extract the coding parameters, described above, from each coded object descriptor and to feed the coding parameters to the coding parameter output CP of the selective partial decoder 322.

The decoding state decision module 269 determines the coding state to which each of the object descriptor variable decoders 266-1 to 266-N in the selective partial decoder 322 partially decodes a respective coded object descriptor. The coded object descriptors fed to the object descriptor variable decoders are also fed to the decoding state decision module. The decoding state decision module determines whether the coded object descriptor was originally coded using block-based techniques, such as block-based MC-prediction and block-DCT, and whether the tiles into which the object is divided align with the blocks into which the current picture will be divided for block-based coding. These conditions can be met, for example, in an object that is a background object or a sprite. When a coded object descriptor meets these conditions, the coding state decision module instructs the respective object descriptor variable decoder to decode the coded object descriptor to tiles of DCT coefficients or to sets of runlength-coded DCT coefficients, or not to decode the coded object descriptors at all. Otherwise, the coding state decision module instructs the respective object descriptor variable decoder to decode the coded object descriptor to tiles of subsampled YUV pixel values.

The object descriptor variable decoders 266-1 to 266-N and the decoding state decision module 269 may be configured to decode the coded object descriptors to coding states different from those described above. Additionally or alternatively, the object descriptor variable decoders and the decoding state decision module may be configured to decode the coded object descriptors to more coding states than those described above.

The selective partial decoder 322 feeds the partially decoded object descriptors PDOD generated by the object descriptor variable decoders 266-1 to 266-N and the decoded scene descriptor DSD generated by the scene descriptor decoder 167 to the block-based picture generator 323. The selective partial decoder additionally feeds the coding parameters CP extracted from the coded object descriptors by the object descriptor variable decoders 266-1 to 266-N to the table generator 324.

The processing performed in process 306 of the transcoding method 300 and by the block-based picture generator 323 of the transcoder 320 will now be described in further detail. The current block-based picture is generated by determining each tile of each object represented by one of the partially-decoded object descriptors PDOD that appears in each block of the block-based picture. This may involve changing one or both of the scale and orientation of one or more of the objects or otherwise mapping the objects onto the block-based picture. Where objects overlap, mask and merge operations are performed. When the alpha mask of one object that overlaps another is binary, only one object is visible at a given pixel of the picture. Alternatively, when the alpha mask of one object that overlaps another is a gray scale, a linear combination of the object and the underlying object is visible. Finally, the pixels of the objects are mapped onto the pixels of the block-based picture, and each tile of each object that appears in each block of the block-based picture is identified.

Process 306 includes the process 307, which may be performed by the table generator 324. Process 307 generates the visibility and coding table 325 for the current picture. The visibility and coding table stores information relating to the object-based coding of each object that appears in each block of the current picture. The information stored in the visibility and coding table is used in process 308 and by the partial encoder 326 in predictively coding the block-based picture signal.

The visibility and coding table 325 includes an entry for each block into which the block-based coding divides the current picture. The entry for each block in the visibility and coding table identifies the one or more objects that appear in the block and includes the coding parameters of such objects. In a preferred embodiment, the entry for each block in the visibility and coding table additionally identifies the one or more tiles of each object that appears in the block and includes the coding parameters of such tiles.

Figure 7:
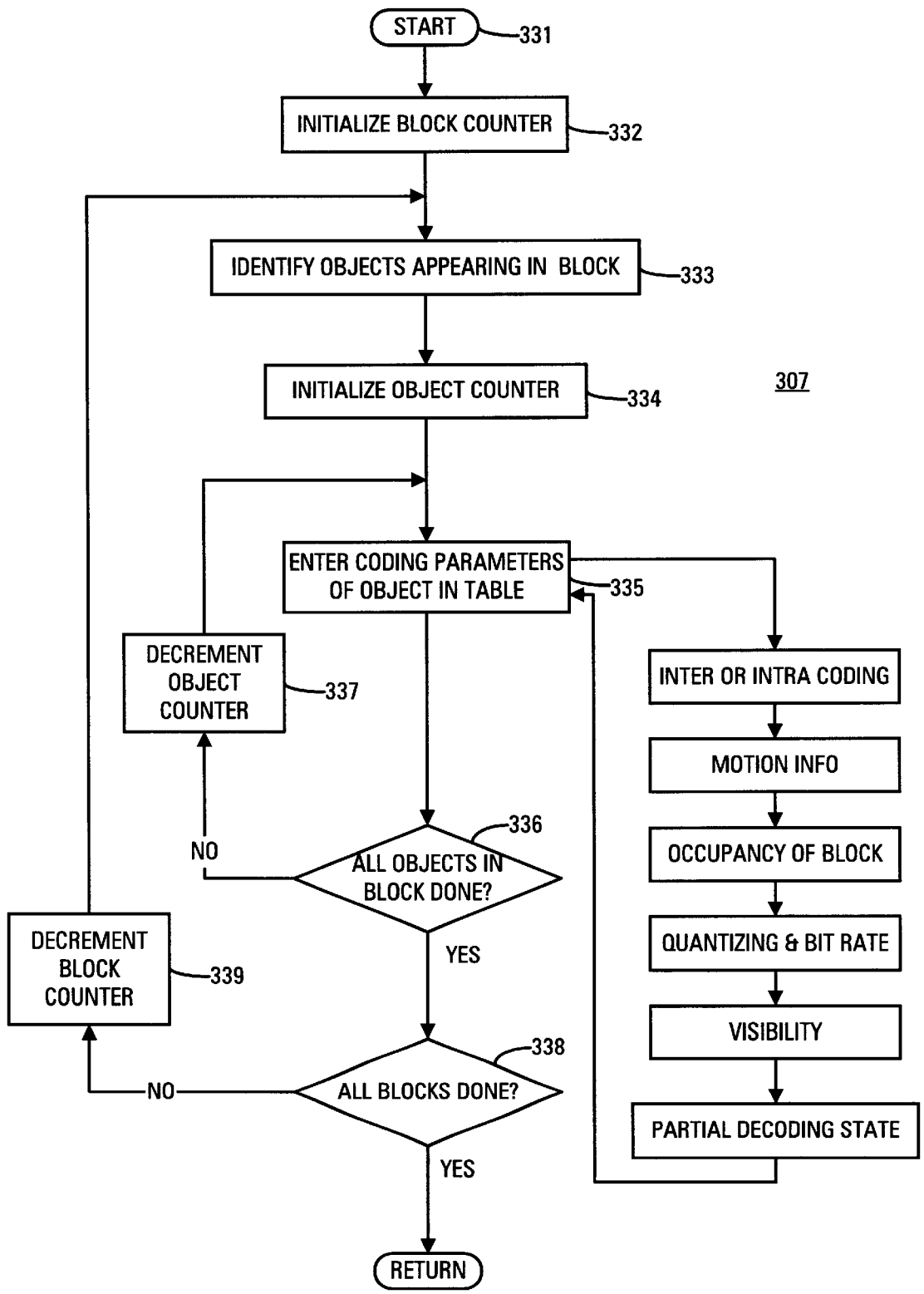
FIG. 7 is a flow chart illustrating the processing performed by the visibility and coding table generation process of the transcoding method shown in FIG. 5 and by the table generator of the transcoder shown in FIG. 6A.

Details of the process 307 that generates the visibility and coding table 325 are shown in FIG. 7. The process 307 may be performed by the table generator 324 to generate the visibility and coding table 325 in the transcoder 320 shown in FIG. 6A. Execution starts in process 331.

In process 332, a block counter that keeps track of the blocks of the current picture is initialized to the number of blocks into which the current picture is divided for block-based coding.

In process 333, the one or more objects that appear in the current block of the current picture are identified and the identifications are added to the entry for the current block in the visibility and coding table. The current block is indicated by the block counter.

In process 334, an object counter is initialized to the number of objects identified by process 333 as appearing in the current block.

In process 335, the coding parameters of the object indicated by the object counter are entered into the entry for the current block in the visibility and coding table. The coding parameters that are entered into the table will be described below. In a preferred embodiment, the coding parameters include coding parameters that pertain to the tiles of the objects that appear in the current block.

In process 336, the object counter is tested to determine whether the coding parameters of all the objects identified as appearing in the current block have been entered into the visibility and coding table. When the test result is NO, execution returns to process 337, where the object counter is decremented by one, and then to process 335 so that the coding parameters of another of the objects that appear in the current block can be added to the entry for the current block in the visibility and coding table.

When the test result generated by process 336 is YES, execution advances to process 338. In process 338, the block counter is tested to determine whether all of the blocks of the current picture have been processed. When the test result is NO, execution advances to process 339, where the block counter is decremented by one, and then to process 333 so that another of the blocks of the current picture can be processed. When the test result is YES, execution returns to the main routine.

FIG. 7 also shows examples of the coding parameters entered in process 335 into the visibility and coding table for each object appearing in each block of the current picture. The example coding parameters shown are:

1. Data indicating whether the portion of the object that appears in the block was coded predictively (i.e., inter), non-predictively (i.e., intra), or part-inter and part-intra.
2. Motion information for the object.
3. The amount of overlap between the object and the block. This can be indicated by, for example, the number of pixels of the block generated from the object.
4. Quantizing and bit rate parameters.
5. Bits indicating whether the portion of the object that appears in the block is visible, partly visible, or hidden.
6. The coding state to which the selective partial decoder decoded the coded object descriptor of the object.

The block of the current picture represented by each entry of the visibility and coding table may correspond to the MPEG-2 macroblock, i.e., a block of 16×16 pixels. Alternatively, the block may correspond to a sub-block of the MPEG-2 macroblock having a size of 8×8 pixels, 4×4 pixels, 2×2 pixels or even possibly 1×1 pixels. Smaller-sized blocks are simpler to process because it is more likely such blocks will be single-object blocks in which only one object appears. However, smaller-sized blocks impose substantially increased memory and processing requirements. If a fixed block size is used, blocks of 8×8 pixels provide a reasonable tradeoff between performance and memory requirements.

Figure 8:
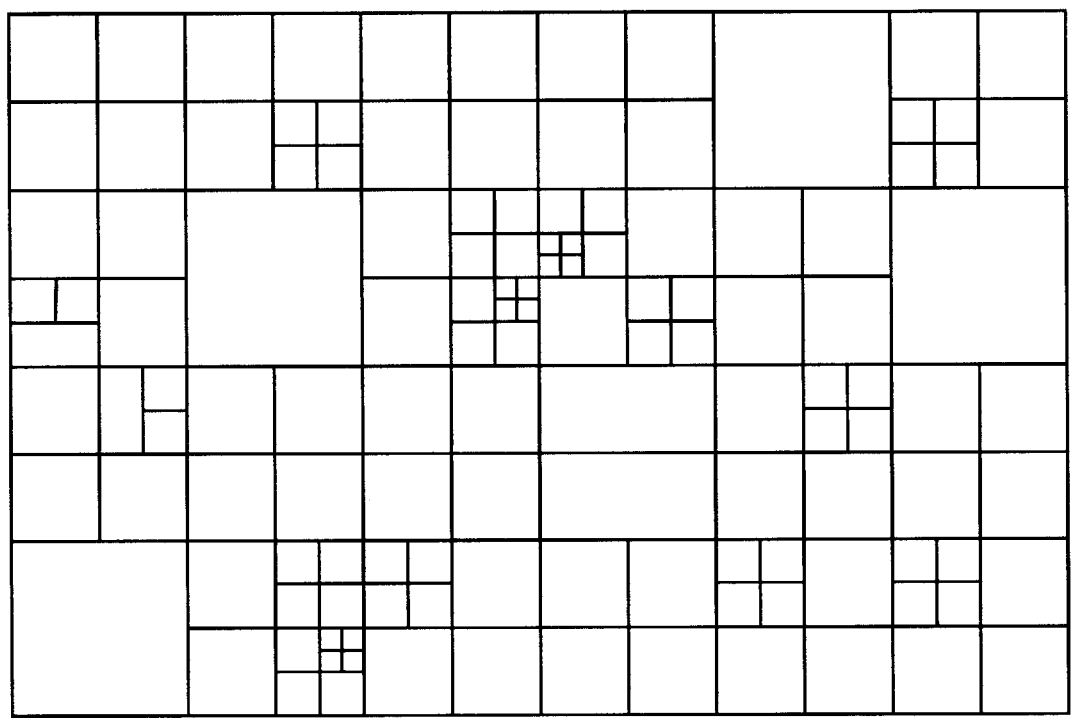
FIG. 8 illustrates how the blocks to which the entries in the visibility and coding table pertain can be sub-divided.

The visibility and coding table entries do not require blocks of a fixed size and shape. The entries in the visibility and coding table may correspond to blocks whose size and shape are dynamically determined with the aim of minimizing complexity consistent with the block being a single-object block. For example, a quadtree or hierarchical representation can be used with square or rectangular blocks having block sizes that range from 32×32 (or more) pixels to 2×2 pixels. An example of a hierarchical representation in which some of the blocks are divided into progressively smaller blocks is shown in FIG. 8. When the blocks to which the entries in the visibility and coding table relate vary in size and shape, entries that relate to blocks smaller than full size should include information indicating the size, shape and location of the block. This information may be provided using a number of techniques. For example, a quadtree representation may be used.

The motion information stored in the visibility and coding table for each object may describe the object's motion using a block-based model, similar to that used in MPEG-2, or using a parametric motion model. The object's motion is used as the basis of a motion vector that predicts the block of the current picture in which the object appears from one or more previously-coded picture in which an instance of the object appears.

As noted above, the block-based model that can be used to code the object descriptor in an object-based encoder is similar to the block-based model used in conventional block-based coding. However, the size of the tiles into which the object's amplitude descriptor is divided for MC-prediction need not be fixed in size, and may be 16×16 pixels, 8×8 pixels or another size. Moreover, it is unlikely that the tiles of the object will align with the blocks into which the current picture is divided for block-based coding. Consequently, as noted above, more than one tile of an object will appear in most of the blocks overlapped by the object in the current picture. The entry for each block in the visibility and coding table includes the motion vectors or other motion information for each tile of each object that appears in the block. The entry may additionally include information that provides some indication of the importance of the motion vector of each tile that appears in the block. For example, the entry may include information indicating each tile's occupancy of the block. This information can be used to indicate the importance of the motion vector of each tile—the greater the occupancy, the more important the motion vector.

When the motion of an object appearing in a block is described using a parametric motion model, either or both the motion model and a representative motion vector generated using the model can be included in the entry for the block in the visibility and coding table. Parametric motion models describe an object's motion by some form of mapping, such as affine or perspective. When the parametric motion model is included in the entry, a formula and a set of parameters that are used to compute the motion of every pixel are entered into the table. Representative motion vectors may include vectors representing the motion of the center of the block or the corners of the block, or median or average motion vectors, for example.

The visibility and coding table may express motion relative to the coordinates of the current picture to simplify subsequent processing. In an object-based picture signal, an object's motion descriptor expresses the object's motion relative to the object's own coordinate system. Moreover, the scene descriptor may not only define the position of the object in the picture, but may also indicate the motion of the entire object from one picture to the next. Therefore, the motion of an object relative to the coordinates of the current picture $MV_{picture}$ is equal to the sum of the motion expressed by the scene descriptor $MV_{scene}$ and the object's own motion descriptor $Mv_{object}$, i.e.:

$$MV_{picture}=MV_{scene}+MV_{object}$$

The visibility and coding table 325 is used in the process of predictively coding each block into which the current picture is divided for block-based coding. The visibility and coding table is additionally used to assist in other processing steps such as re-quantizing and partial re-encoding. The visibility and coding table can be stored as long as the picture to which it relates is used as to generate reference pictures for predictively coding other pictures. For example, conventional MPEG-2 encoding involves three pictures, namely, the current picture and two previously-coded pictures. Consequently, three visibility and coding tables need to be stored, one for each of these pictures.

The processing performed in process 308 of the transcoding method 300 shown in FIG. 5 and by the partial encoder 326 of the transcoder 320 shown in FIG. 6A will now be described in detail. In this process, the blocks of the partially-coded block-based picture signal representing the current picture are partially encoded to bring them to a uniform coding state. Encoding each block of the partially-coded block-based picture signal involves determining the best way to encode the block. This includes determining whether to encode the block predictively, i.e., as an inter-coded block, or non-predictively, i.e., as an intra-coded block. When the block is to be coded predictively, the motion vector for the MC-prediction is additionally determined.

Figure 6C:
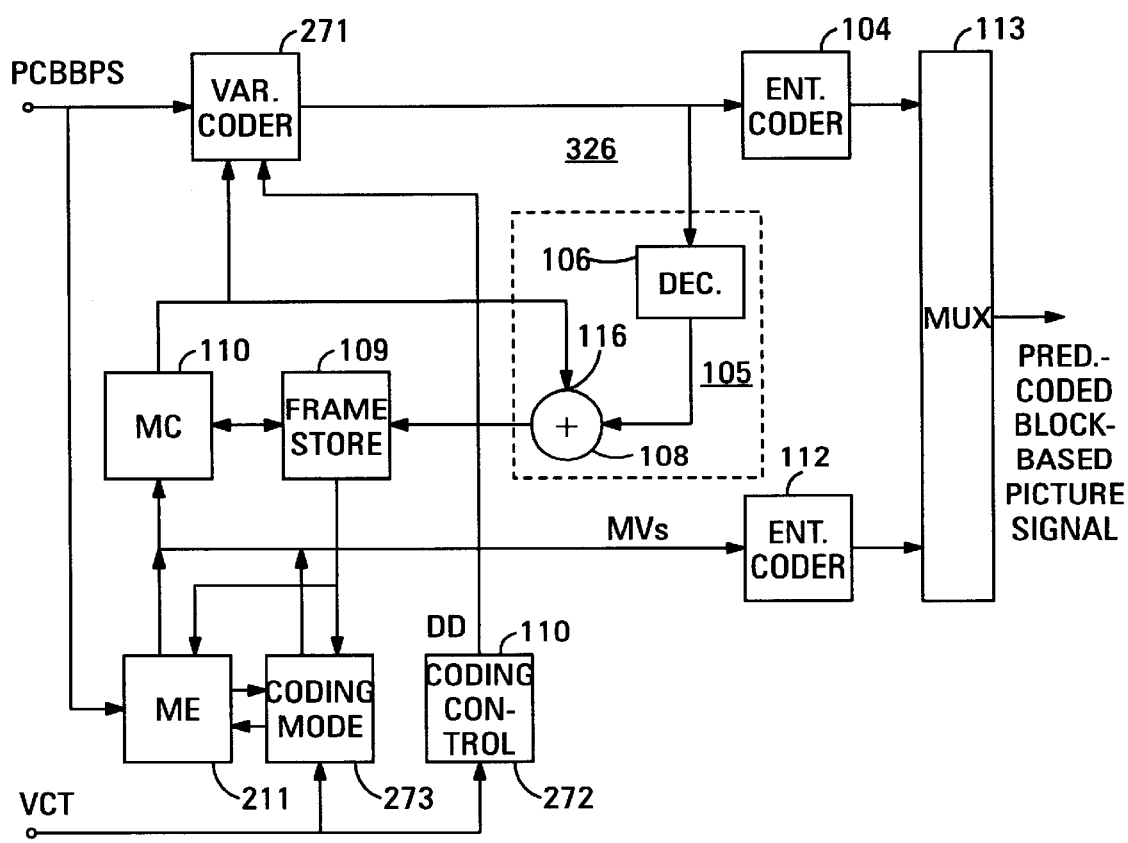
FIG. 6C is a block diagram showing the structure of the partial encoder of the transcoder shown in FIG. 6A.

FIG. 6C shows an example of the partial encoder 326 that forms part of the transcoder 320 shown in FIG. 6A. The partial encoder 326 is similar in structure to the block-based encoder 100 shown in FIG. 3A. Elements of the partial encoder 326 that correspond to elements of the block-based encoder 100 are indicated using the same reference numerals and will not be described further.

The embodiment of the partial encoder 326 shown is structured to code the blocks of either subsampled YUV pixel values or DCT coefficients that constitute the partially-coded block-based picture signal PCBBPS to the same coding state. The partial encoder includes the variable encoder 271. The partial encoder encodes all the blocks of the partially-coded block-based picture signal to the same coding state. The partial encoder can additionally be structured to code blocks of the partially-coded block-based picture signal in other coding states to the above-mentioned same coding state.

In the embodiment of the transcoder 320 shown, the blocks of the partially-coded block-based picture signal are either blocks of subsampled YUV pixel values or blocks of DCT coefficients. The coding state of each block is indicated by coding state information in the entry for the block in the visibility and coding table VCT. The coding controller 272 receives the visibility and coding table, extracts the coding state information for the current block from the visibility and coding table, and feeds a coding state control signal DD to the variable coder 271. The variable encoder then applies the coding specified by the coding state information to the current block.

The visibility and coding table VCT is also fed to the coding mode module 273. The coding mode module operates to determine the coding that will be applied to the current block. The preferred coding mode is MC-prediction coding using a motion vector based on the motion descriptor of the one or more objects that appear in the current block. The coding mode module receives the motion descriptor as part of the entry in the visibility and coding table for the current block.

The coding mode module 273 operates in preference to the motion estimator 211 since it demands substantially fewer processing resources. However, when the coding mode module determines that predictively coding the current block using a motion vector based on the motion descriptor of the one or more objects that appear in the current block is impossible or inefficient, it can activate the motion estimator to determine a motion vector for predictively coding the current block.

The motion estimation performed by the motion estimator 211 may use the motion descriptors included in the entry in the visibility and coding table for the current block as a starting point to perform a simplified motion estimation operation. Alternatively, the motion estimator may perform a full motion estimation operation to generate a motion vector from scratch. Finally, the coding mode module 273 may determine that the current block is best coded without prediction, i.e., as an intra-coded block. Operation of the coding mode module will be described in more detail below with reference to FIGS. 12 and 13A–13D.

In determining the coding mode for the current block, the coding mode module 273 classifies the current block into one of the following categories:

a single-object (SO) block in which only one object appears; and a multiple-object (MO) block in which more than one object appears.

When the current block is a single-object block, all the coding parameters in the entry for the current block in the visibility and coding table come from a single object. In this case, the coding mode module 273 need only analyze the coding parameters for the single object to determine how to code the block. However, when the current block is a multiple-object block, the coding mode module must analyze the coding parameters of multiple objects to determine how to code the block. The analysis applied to the multiple-object block is substantially more complex because, in contrast to conventional block-based coding, in which each block can only be coded one way, i.e., inter or intra, some or all of the objects appearing in the multiple-object current block may have been coded in different ways. The coding mode module must determine a single motion vector for predictively coding the current block. The coding mode module can often efficiently estimate the motion vector of the current block from the motion descriptor of the object when the current block is a single-object block. However, when the current block is a multiple-object block, two or more objects, each with its own, independent motion, may appear in the block. The motion vectors representing the motion of the two or more objects were coded independently by the object-based coding. However, the coding mode module must assign a single motion vector to the entire current block.

For each block into which the current picture is divided for block-based coding as a current block, process 308 of the transcoding method 300 and the coding mode module 273 examine the specific characteristics of the current block, including the objects that appear in the block, how the objects were coded, etc., and then adaptively choose a coding method for the current block from a set of possible coding methods. The coding method chosen is that which is most appropriate for the current block. Factors taken into account in choosing the coding method include the desired coding goals (e.g., bit rate, variable bit rate vs. constant bit rate, etc.), processing resources available, software/hardware architecture, etc.

Using the motion descriptors of the one or more objects that appear in the current block as the basis for the motion vector for coding the current block is more complex than it might at first appear. In object-based coding, each object is predictively coded using a reference instance derived from one or more previously-coded instances of the object. In conventional block-based coding, each picture is coded using one or more previously-coded pictures as reference pictures. Transcoding is complex because the one or more previously-coded instances from which was derived the reference instance for originally coding the instance of the object in the current picture may not appear in one or both of the previously-coded pictures from which is derived the reference picture for coding the current picture.

Figures 9A, 9B, 9C:
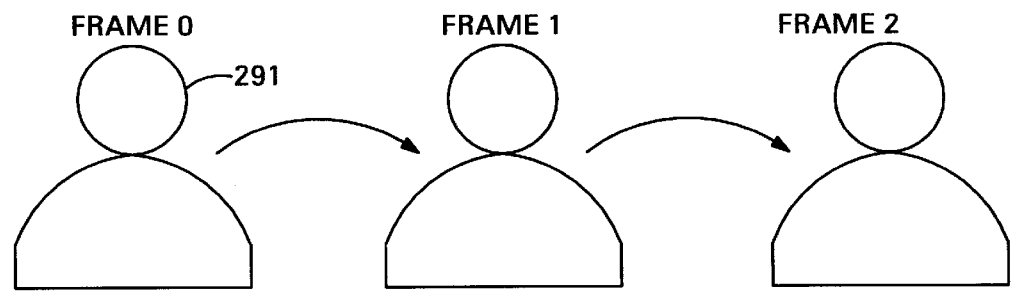
FIGS. 9A–9I illustrate the coding of a simple three-object, three-frame moving picture using object-based coding.
Figures 9D, 9E, 9F:
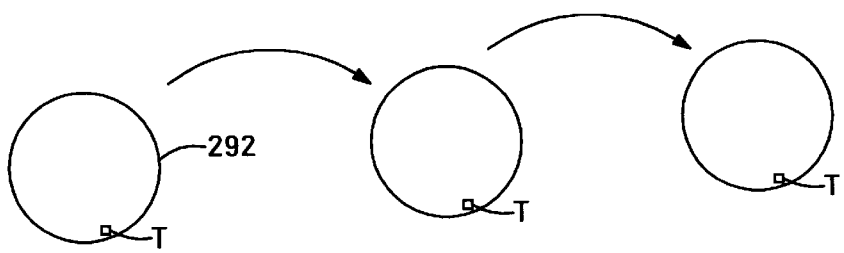
Figures 9G, 9H, 9I:
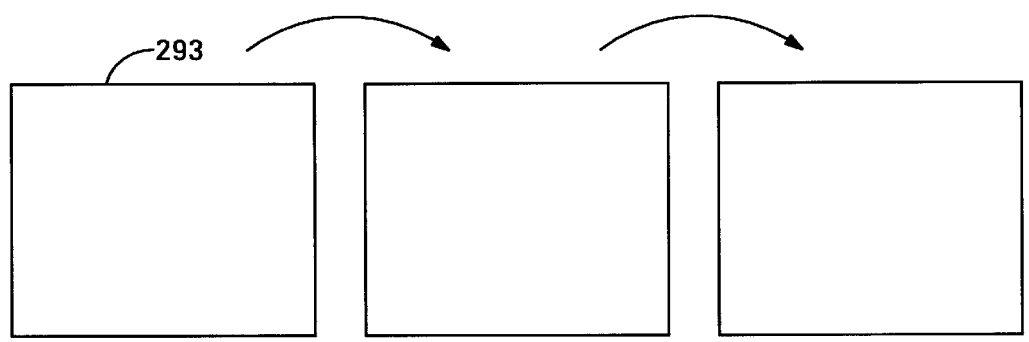

For example, FIGS. 9A–9I illustrate the coding of a simple three-object, three-frame moving picture using object-based coding. FIGS. 9A–9C show the person object 291, FIGS. 9D–9F show the balloon object 292 and FIGS. 9G–9I show the background object 293 in consecutively-presented frames frame 0, frame 1, and frame 2. The instances of the person object, the balloon object and the background object are independently coded in frame 0. The instances of the objects in frame 1 shown in FIGS. 9B, 9E and 9H are coded with forward prediction using the instances of the object in frame 0 shown in FIGS. 9A, 9D and 9G as respective references. The instances of the objects in frame 2 shown in FIGS. 9C, 9F and 9I are coded with forward prediction using the instances of the object in frame 1 as respective references. In object-based coding, each object may be coded completely independently of other objects regardless of any occlusion of the object by the other objects in the composed picture. Thus the tile T of the instance of the balloon object 292 in frame 1 can serve as a reference for predictively coding the tile T of the instance of the balloon object in frame 2 even though the tile T of the balloon object in frame 1 is occluded by the body object 291.

Figures 9J, 9K, 9L:
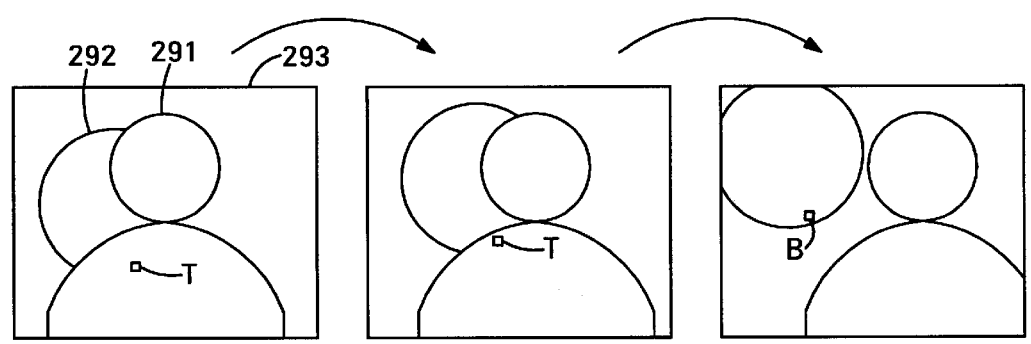
FIGS. 9J–9L illustrate the coding of the simple three-object, three-frame moving picture shown in FIGS. 9A–9I using block-based coding.

In block-based coding, there is no concept of individual objects. When the reference instances with respect to which the instance of the object that appears in the current picture was predictively coded are occluded in one or both of the reference pictures for coding the current picture, the motion descriptors of the object cannot be used to predict the motion of the block of the block-based picture in which the object appears. FIGS. 9J–9L illustrate the coding of the simple three-object, three-frame moving picture using block-based coding. The motion of the block B in which the tile T of the balloon object 292 appears in frame 2 shown in FIG. 9L cannot be predicted using the motion descriptor of the balloon object because the portion of the balloon object represented by the tile T is occluded by the person object 291 in frames 0 and 1 shown in FIGS. 9J and 9K, respectively, and the tile T therefore does not appear in any block of these frames.

Thus, the relationship between the blocks into which the current picture is divided for block-based coding and the objects that appear in the blocks is typically complex. In the following description, it will be assumed that the object-based coding used block-based MC-prediction with each object being divided into tiles of 16×16 pixels. However, the concepts described can be generalized to cover variable-sizes blocks and region-based MC prediction, e.g., parametric motion fields, etc.

Figure 10:
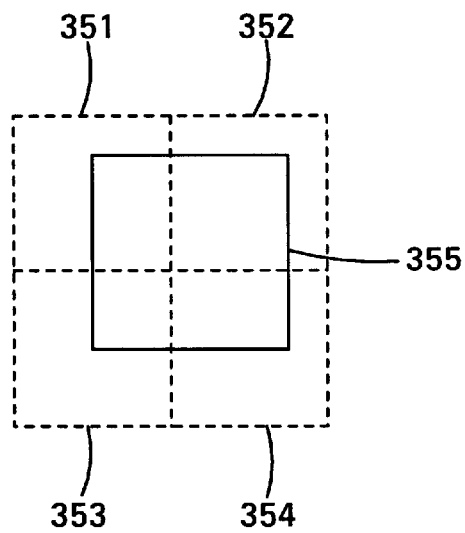
FIG. 10 illustrates how multiple tiles of an object can appear a single block of the block-based picture signal.

As noted above, the tiles of the one or more objects that appear in the current block generally do not coincide with the blocks into which the current picture is divided for block-based coding. This is illustrated in FIG. 10, in which the four tiles 351, 352, 353 and 354 appear in the current block 355. The tiles form part of a single object, the rest of which is not shown to simplify the drawing. The current block is one of the blocks into which the current picture is divided for block-based coding. The whole current picture is not shown to simplify the drawing.

Each of the tiles 351–354 may be coded without prediction, i.e., as intra-coded tiles, or predictively, i.e., as inter-coded tiles. The reference tile for each tile that is predictively coded, i.e., the tile in a previously-coded instance of the object that was used to predict the tile in the instance of the object in the current picture, may be located entirely inside the boundary of the previously-coded instance of the object (an interior tile) or may overlap the boundary of the previously-coded instance of the object (a boundary tile). Moreover, the reference tile may be visible, partly visible or hidden in the previously-coded picture. These possibilities are illustrated in FIGS. 11A and 11B.

Figure 11A:
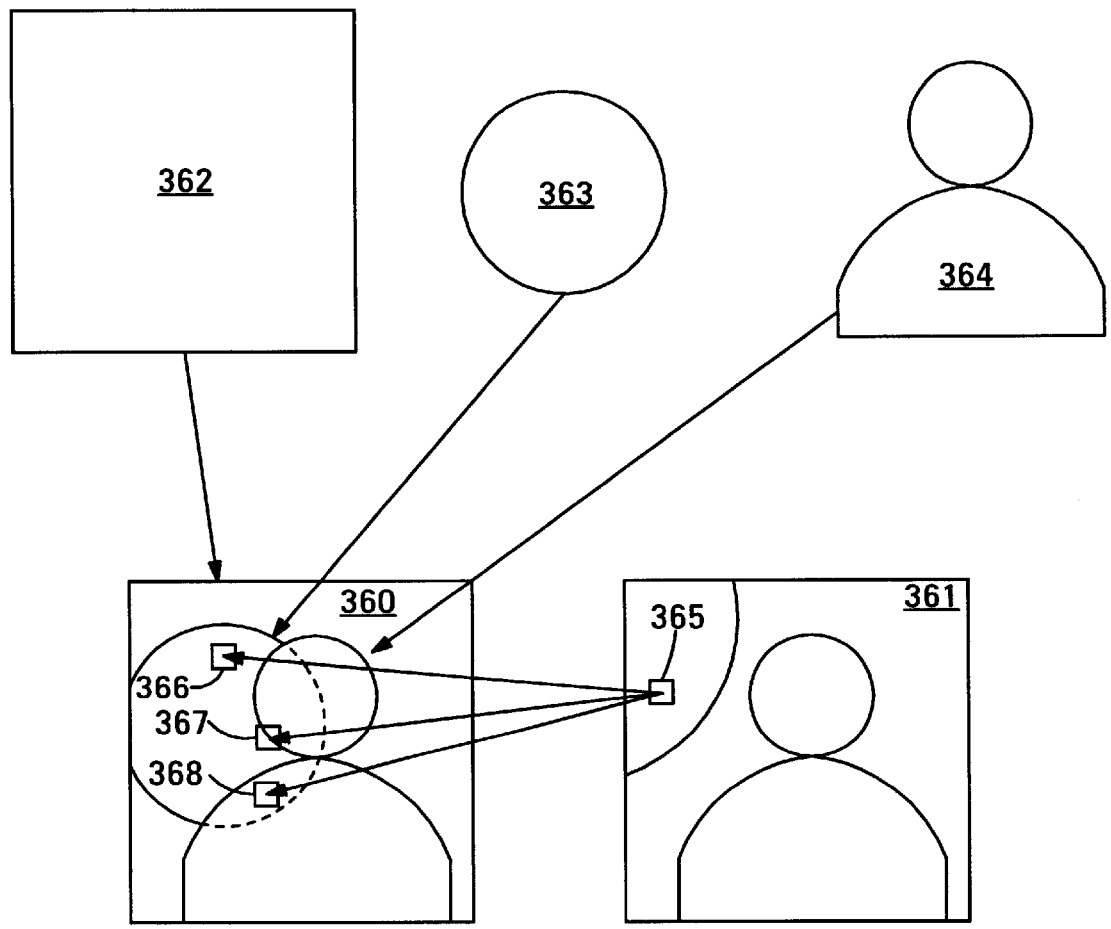
FIG. 11A illustrates how a tile of an instance of an object that appears in a block of the current picture can be predicted using, as a reference tile, an interior tile that is visible, partly hidden or completely hidden in the reference picture.

FIG. 11A illustrates interior tiles of an object in the reference picture 360 acting as reference tiles for coding the current block 365 in the current picture 361. The picture 360 is the reference picture for predictively coding a frame of a block-based picture signal representing the current picture 361. The reference picture 360 was obtained by transcoding a frame of an object-based picture signal that includes object descriptors for the background object 362, the balloon object 363 and the person object 364, and a scene descriptor that places the balloon object and the person object in front of the background object with part of the person object occluding part of the balloon object.

In the current picture 361, the tile 365 is one of the tiles of the balloon object 363 that appears in a single-object block (not shown) of the picture 361. Three possible reference tiles for the tile 365 are shown in the reference picture 360. Of these, the tile 366 is a fully-visible interior tile, the tile 367 is a partly-visible interior tile and the tile 368 is a hidden interior tile.

Figure 11B:
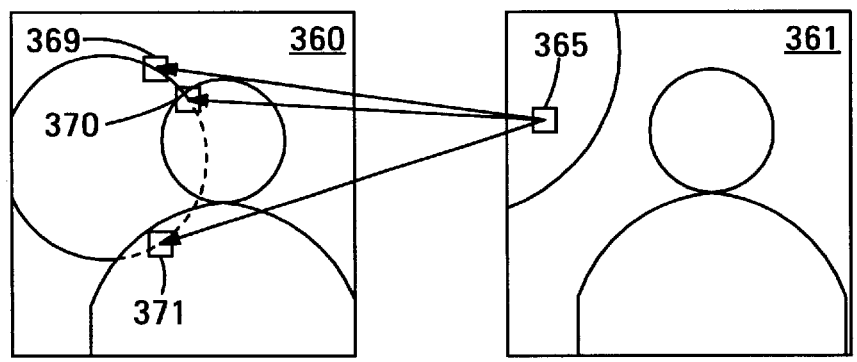
FIG. 11B illustrates how a tile of an instance of an object that appears in a block of the current picture can be predicted using, as a reference tile, a boundary tile that is visible, partly hidden or completely hidden in the reference picture.

FIG. 11B illustrates boundary tiles of an object in the reference picture 360 acting as reference tiles for coding the current block 365 in the current picture 361. In the reference picture 360, the tile 369 is a fully-visible boundary tile, the tile 370 is a partly-visible boundary tile and the tile 371 is a hidden boundary tile.

In object-based coding, the pixels of a boundary tile located within the support of the object are object pixels. The remainder of the pixels of the boundary tile are extrapolated pixels used to form a more efficient shape for performing the object-based motion-compensated prediction. Only the object pixels of the boundary tile can appear in the reference picture-the extrapolated pixels are only used as a tool in object-based coding and are discarded in the picture composition process. Consequently, extrapolated pixels never appear in any picture. In addition, the boundary tile may be visible in the previously-coded picture, or it may be partly visible or completely hidden, as shown in FIG. 11B. Therefore, even in the case of a single-object block, the relationship between each block and the tiles that appear in it can be quite complex. The possible relationships between the current block and the tiles that appear in it when the current block is a single-object block are summarized in Table 1.

TABLE 1

| Tiles Appearing in Current Block | Coding Mode of Tile | Reference Tile Type | Visibility of Reference Tile |
| --- | --- | --- | --- |
| Tile 1 | Intra | — | — |
|  | Inter | Interior | Visible |
|  |  |  | Partly Visible |
|  |  |  | Hidden |
|  |  | Boundary | Visible |
|  |  |  | Partly Visible |
|  |  |  | Hidden |
| Tile 2 | Intra | — | — |
|  | Inter | Interior | Visible |
|  |  |  | Partly Visible |
|  |  |  | Hidden |
|  |  | Boundary | Visible |
|  |  |  | Partly Visible |
|  |  |  | Hidden |
| . | . | . | . |
| . | . | . | . |
| . | . | . | . |
| Tile N | Intra | — | — |
|  | Inter | Interior | Visible |
|  |  |  | Partly Visible |
|  |  |  | Hidden |
|  |  | Boundary | Visible |
|  |  |  | Partly Visible |
|  |  |  | Hidden |

When the current block is a multiple-object (MO) block, more than one object appears in the block. Each object appearing in the current block may have the structure and complexity of the object appearing in the single-object block described above. This is illustrated in Table 2.

TABLE 2

| Block Type of Current Block | Coding |
| --- | --- |
| Multiple-Object Block | Table 1 for Object 1 |
|  | Table 1 for Object 2 |
|  | . |
|  | . |
|  | . |
|  | Table 1 for Object N |

To optimize the coding performance of the partial encoder 326 and the partial encoding processing 308, the structure of the current block is identified and then the current block is processed based on its structure. To provide good coding performance in all the different possible scenarios, the processing is adapted in response to the tiles that appear in the block.

Figure 12:
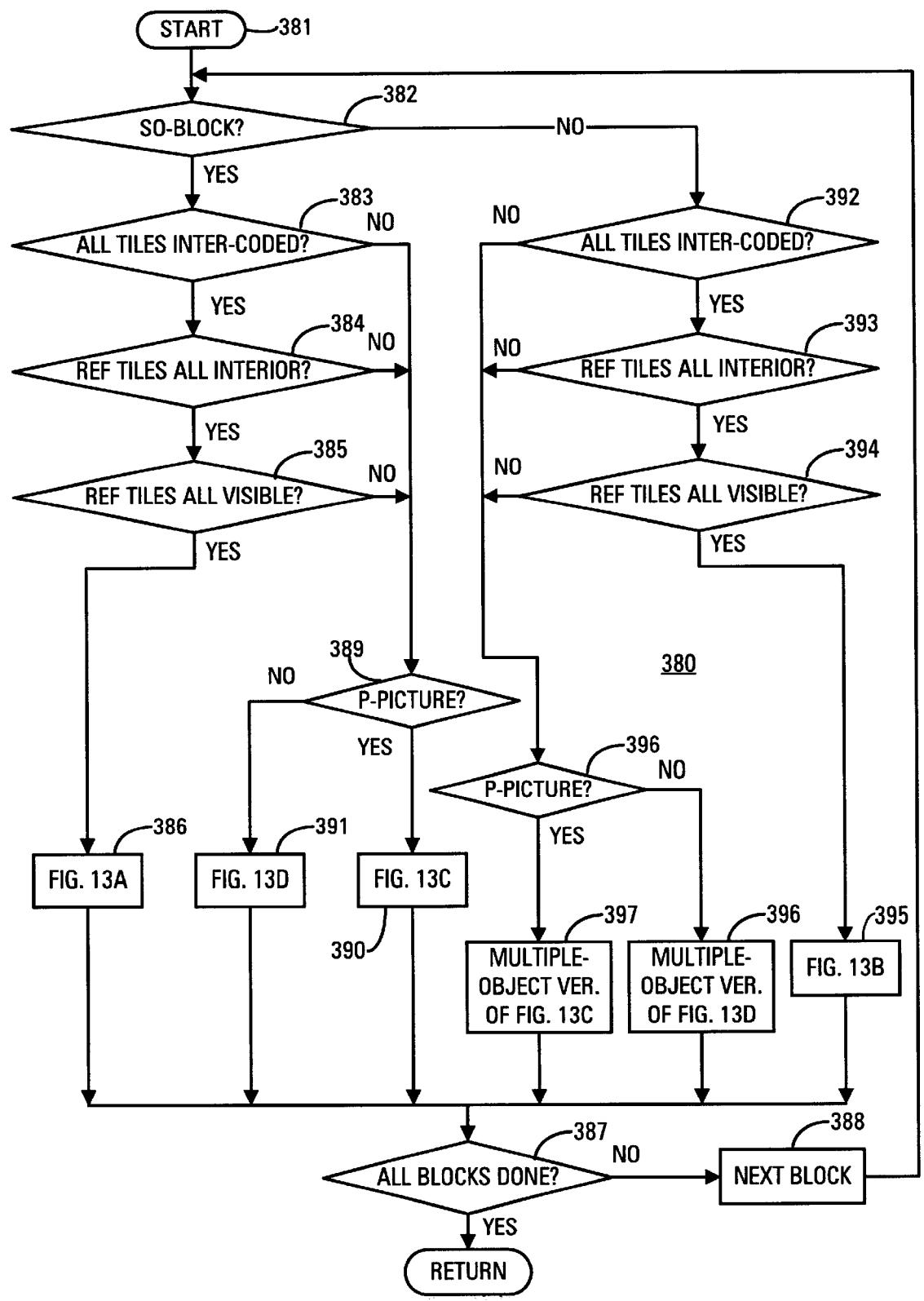
FIG. 12 is a flow chart illustrating the high-level processing performed in the partial encoding process of the transcoding method shown in FIG. 5 and by the partial encoder of the transcoder shown in FIG. 6A.

FIG. 12 shows an example of the process 380 performed by the coding mode module 273 in the partial encoder 326 and as part of the partial coding processing 308. The coding processing encodes each block of the block-based picture signal as a current block using one of a number of different coding processes, each adapted to process a block with different characteristics, as described above. Exemplary coding processes will be described below with reference to FIGS. 13A–13D. Prior to coding the current block, the process 380 analyses the block to determine the optimum one of the coding processes to use to code the current block.

Execution starts in process 381.

In process 382, a test is performed on the entry for the current block in the visibility and coding table to determine whether the current block is a single-object block. When the test result is YES, execution advances to process 383, which will be described next. When the test result is NO, execution advances to process 392, which will be described below.

In processes 383–385, a series of tests is performed on the entry for the current block in the visibility and coding table to determine whether all the tiles that appear in the current block are inter-coded, whether the reference tiles for such tiles are all interior tiles and whether the reference tiles are all visible. When the test result in all the processes is YES, this indicates that the current block is an SO/All-Inter/All-Interior/All-Visible block, and execution advances to process 386, which will be described next. When the test result in any of the processes is NO, this indicates that the current block is a block in which some of the tiles appearing therein are intra-coded, or in which some of the tiles are inter-coded using reference tiles that are boundary tiles or are at least partly hidden. In this case, execution advances to process 389, which will be described below.

Figure 13A:
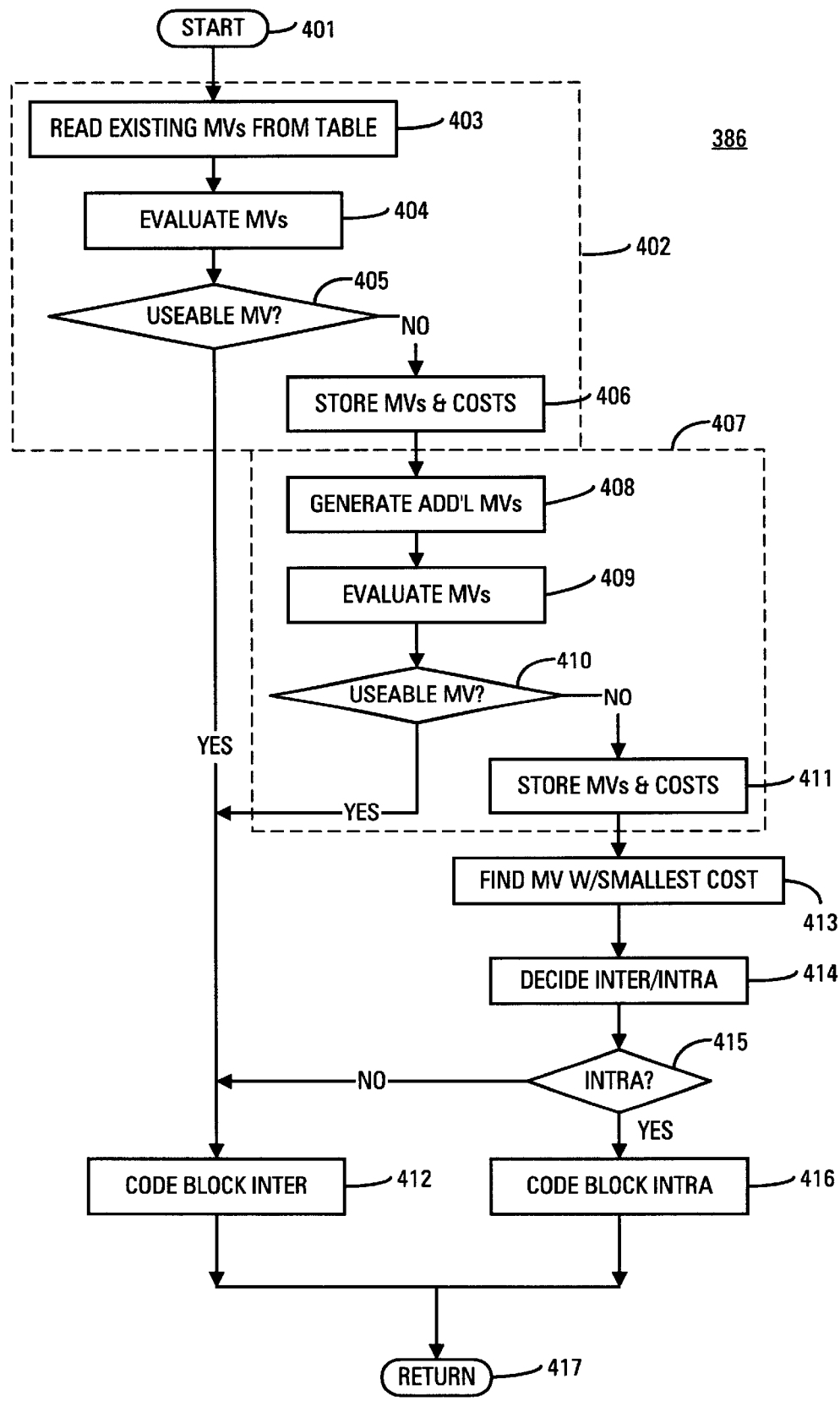
FIG. 13A is a flow chart illustrating the processing performed in the partial encoding process and by the partial encoder when the current block is a single-object/all inter/all interior/all visible block.

YES results in all of processes 383–385 cause execution to advance to process 386, where the current block is coded using the coding process to be described below with reference to FIG. 13A. Execution then advances to process 387, where a test is performed to determine whether all the blocks of the current picture have been coded. When the test result is YES, execution returns to the main routine. When the test result is NO, execution returns to process 382 via process 388, which causes the next block to be processed.

A NO result in the test performed in any of processes 383–385 causes execution to advance to process 389, where a test is performed to determine whether the current picture is being coded as a P-picture. A P-picture is a picture that is predominantly predictively coded using only forward motion compensation (F-MC). A YES result causes execution to advance to process 390, where the current block is coded using the coding process to be described below with reference to FIG. 13C. Execution then advances to process 387, described above.

A NO result in the test performed in process 389 indicates that the current picture is being coded as a B-picture. A B-picture is a picture that is predominantly predictively coded using forward, backward and bidirectional motion compensation. In this case, execution advances to process 391, where the current block is coded using the coding processing to be described below with reference to FIG. 13D. Execution then advances to process 387, described above.

A NO result in process 382 indicates that the current block is a multi-object block, and causes execution to advance to process 392. In processes 392–394, a series of tests similar to those performed in processes 383–385 is performed on the entry for the current block in the visibility and coding table. The series of tests is performed on the tiles of each of the objects indicated in the visibility and coding table as appearing in the current block. A test result of YES in all the tests indicates that the current block is an MO/All-Inter/All-Interior/All-Visible block, and execution advances to process 395, where the current block is coded using the coding process to be described below with reference to FIG. 13B. Execution then advances to process 387, described above.

When the test result in any of the processes 392–394 is NO, this indicates that the current block is a multiple-object block in which some of the tiles appearing therein are intra-coded, or in which some of the tiles are inter-coded using reference tiles that are boundary tiles or are at least partly hidden. In this case, execution advances to process 396, where a test is performed to determine whether the current picture is being coded as a P-picture. A YES result causes execution to advance to process 397, where the current block is coded using a coding process in which the coding process to be described below with reference to FIG. 13C is performed for each object that appears in the current block. Execution then advances to process 387, described above.

A NO result in the test performed in process 396 indicates that the current picture is being coded as a B-picture. In this case, execution advances to process 396, where the current block is coded using a coding process in which the coding processing to be described below with reference to FIG. 13D is performed for each object that appears in the current block. Execution then advances to process 387, described above.

The coding process 386 will be described first with reference to FIG. 13A. The coding process is for coding the current block when the current block is an SO/All-Inter/All-Interior/All-Visible in which:

All tiles appearing in the block are predictively-coded (i.e., inter-coded);

All reference tiles for the tiles appearing in the block are interior tiles, and All reference tiles for the tiles appearing in the block are visible in the reference picture.

Execution starts at process 401. First, the subroutine 402 is executed to determine whether or not the current block can be predictively coded using any of the motion vectors that exist in the entry for the current block in the visibility and coding table. Subroutine 402 is composed of the processes 403 through 406. Subroutine 402 exits on one of two paths, depending on the test result obtained in process 405, i.e., whether or not the current block can be predictively coded using one of the existing motion vectors.

In process 403, the motion vectors are read from the entry for the current block in the visibility and coding table.

In process 404, the cost of using each of the existing motion vectors as the motion vector for predictively coding the current block is determined. The cost may be determined using any appropriate metric, such a mean-square error (MSE), mean-absolute error (MAE), the number of bits required to code the MC-residual, or an R+$\lambda$D (rate-distortion) formulation.

In process 405, a test is performed to determine whether any of the existing motion vectors is useable as the motion vector for predictively coding the current block. This can be determined, for example, by determining whether the cost determined in process 404 of using any of the existing motion vectors is less than a predetermined threshold cost. When the test result is YES, execution of the subroutine exits to process 412, where the current block is predictively coded using the one of the existing motion vectors, as will be described in further detail below.

When the test result generated by process 405 is NO, indicating that predictively coding the current block using any one of the existing motion vectors would incur too high a cost, execution advances to process 406. In process 406, the existing motion vectors and their respective costs are stored. The costs may be stored together with their respective existing motion vectors in the entry for the current block in the visibility and coding table, for example. Execution of the subroutine 402 then exits to subroutine 407.

Subroutine 407 generates additional motion vectors that may potentially be used in predictively coding the current block, and determines whether or not the current block can be predictively coded using any one of the additional motion vectors. Subroutine 407 is composed of processes 408 through 411. Subroutine 407 exits on one of two paths, depending on the test result in process 410, i.e., whether or not the current block can be predictively coded using one of the additional motion vectors.

In process 408, additional motion vectors are generated for the current block. Refined versions of the initial motion vectors may be generated as the additional motion vectors. Additionally or alternatively, the motion vectors that exist in the visibility and coding table can be used to predict the additional motion vectors. As a further alternative, a new motion vector can be generated, as will be described in more detail with reference to FIGS. 13C and 13D.

In process 409, the cost of using each of the additional motion vectors as the motion vector for predictively coding the current block is determined.

In process 410, a test is performed to determine whether any of the additional motion vectors is useable as the motion vector for coding the current block. This can be determined, for example, by determining whether the cost determined in process 409 of using any of the additional motion vectors is less than a predetermined threshold. The threshold may be the same as or different from the threshold used in process 405. When the test result is YES, execution of the subroutine exits to process 412, where the current block is predictively coded using the one of the additional motion vectors, as will be described in further detail below.

When the test result generated by process 410 is NO, indicating that predictively coding the current block using any of the additional motion vectors would incur too high a cost, execution advances to process 411. In process 411, the additional motion vectors and their respective costs are stored. The additional motion vectors and their respective costs may be stored in additional fields provided in the entry for the current block in the visibility and coding table. Execution of the subroutine 407 then exits to process 413.

In process 413, the existing and additional motion vectors for the current block and their respective costs are examined and the motion vector having the smallest cost is selected.

In process 414, the cost of predictively coding the current block using the motion vector selected in process 413 is compared with the cost of coding the current block without prediction. The comparison is used as the basis for making a final decision on whether or not to code the current block predictively.

In process 415, a test is performed on the decision made in process 414 to determine whether the current block is to be coded without prediction, i.e., as an intra-coded block. When the test result is YES, execution advances to process 416, where the current block is coded without prediction. Execution then returns to the main routine.

When the test result in process 415 is NO, indicating that the current block is to be coded predictively using the motion vector selected in process 413, execution advances to process 412.

In process 412, the current block is predictively coded using one of (a) the existing motion vector selected in subroutine 402, (b) the additional motion vector generated and selected in subroutine 407 and (c) the motion vector selected as having the lowest cost in process 413.

After the current block has been coded in either process 412 or process 416, execution advances to process 417, whence it returns to the main routine.

When the current block is a multiple-object (MO) block in which each tile that appears in the current block is All-Inter/All-Interior/All-Visible, in coding process 395, processing similar to that described above with reference to FIG. 13A is applied in which part of the processing is applied to each object that appears in the current block. In this case, the set of motion vectors existing in the entry for the current block in the visibility and coding table may be taken as a union of the sets of motion vectors that exist in the visibility and coding table for each object that appears in the current block.

Figure 13B:
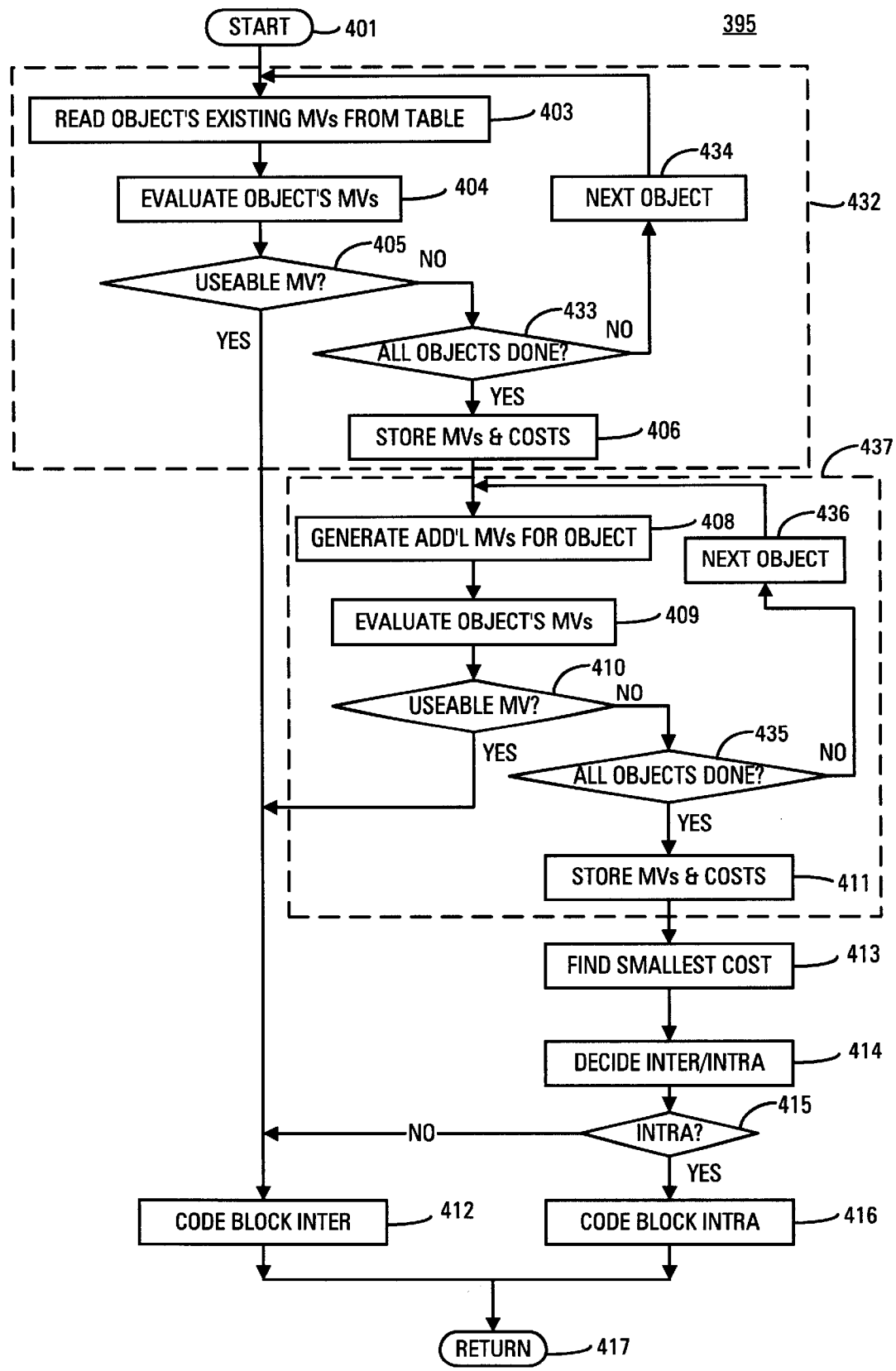
FIG. 13B is a flow chart illustrating the processing performed in the partial encoding process and by the partial encoder when the current block is a multiple-object/all inter/all interior/all visible block.
Figure 13C:
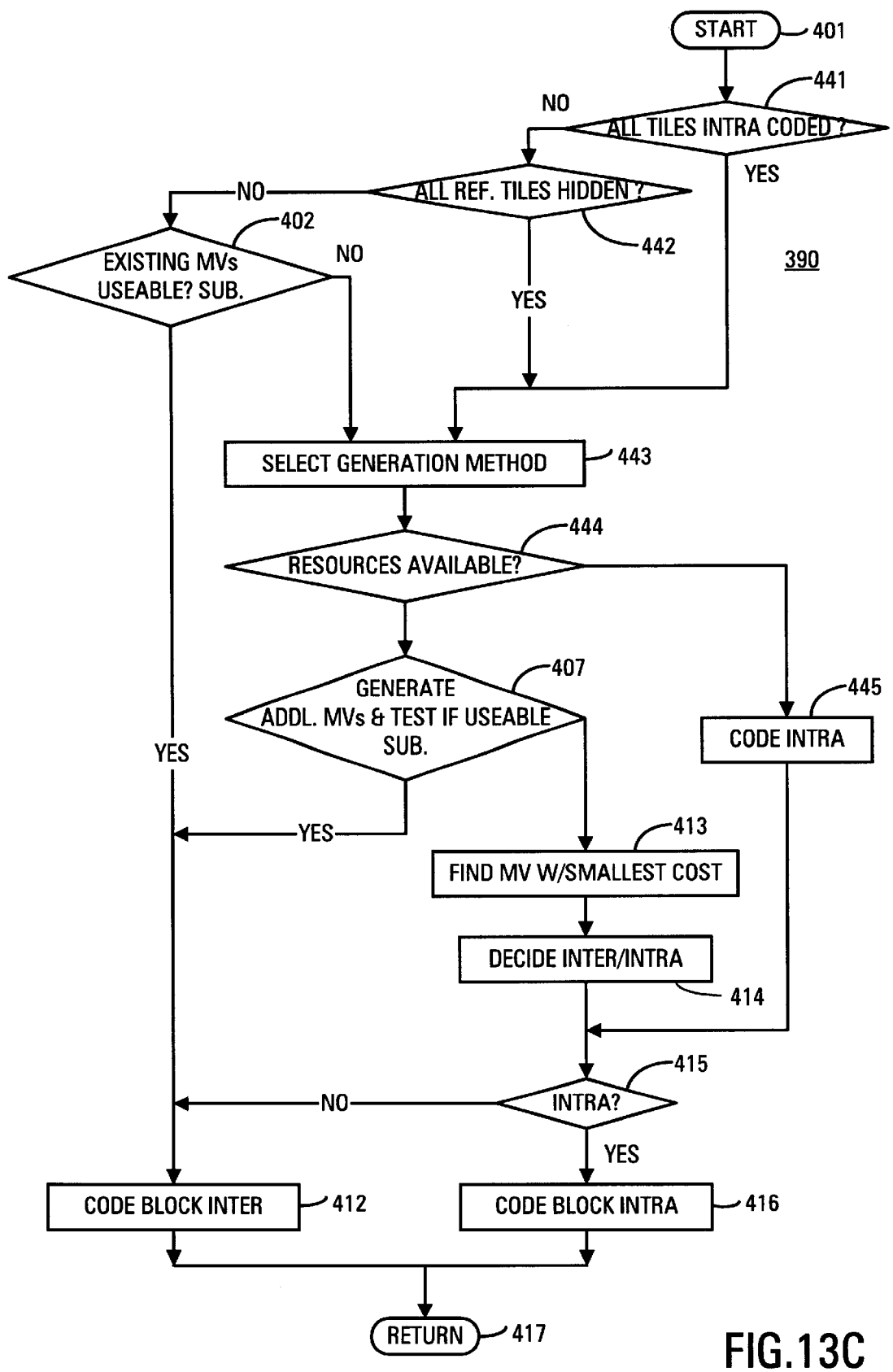
FIG. 13C is a flow chart illustrating the processing performed in the partial encoding process and by the partial encoder when the current block is a single-object block but is not an all inter/all interior/all visible block and the current picture is predictively coded as a P-picture.
Figure 13D:
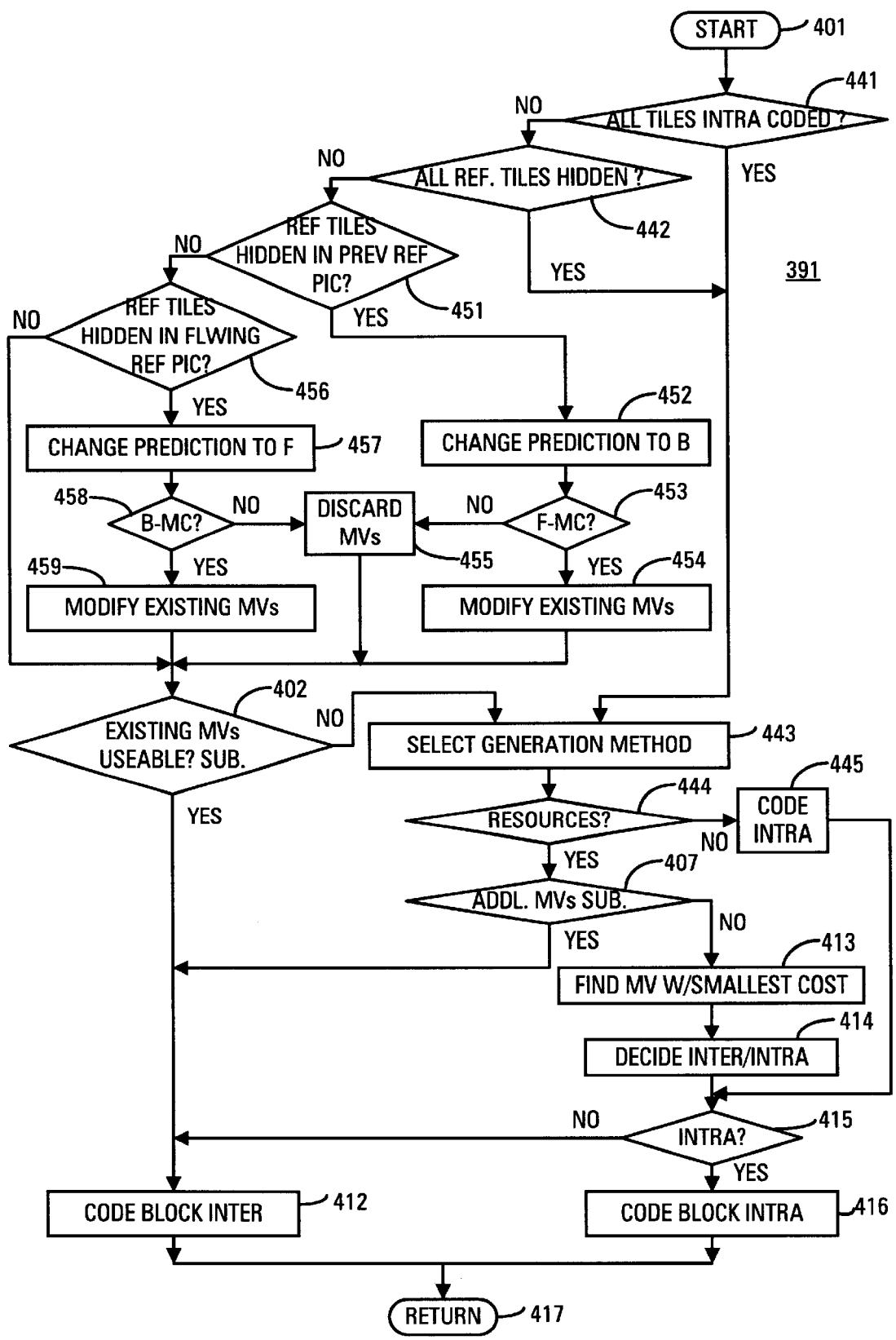
FIG. 13D is a flow chart illustrating the processing performed in the partial encoding process and by the partial encoder when the current block is a single-object block but is not an all inter/all interior/all visible block and the current picture is predictively coded as a B-picture.

FIG. 13B shows an example of the coding process 395 of FIG. 12 used when the current block is an MO-block in which all the tiles appearing therein are All-Inter/All-Interior/All-Visible. Elements of the coding process 395 that correspond to the coding process 386 are indicated by the same reference numerals and will not be described further.

When the current block is an MO-block, part of the coding process 395 is performed on each object that appears in the current block. The object to which the coding process is applied will be called the current object. Thus, for example, in the coding process 395, subroutine 432 determines whether or not one of the motion vectors that exist in the entry for the current block in the visibility and coding table for all of the objects that appear in the current block can be used as the motion vector in predictively coding the current block.

The subroutine 432 is composed of the processes 403–406, 433 and 434. In process 403, the motion vectors for the current object are read out from the entry for the current block in the visibility and coding table. In process 404, cost of using each of the current object's existing motion vectors as the motion vector for predictively coding the current block is determined. In process 405, a test is performed to determine whether any of the current object's existing motion vectors is useable as the motion vector for predictively coding the current block. When the test result in process 405 is NO, execution advances to process 433, where a test is performed to determine whether the existing motion vectors of all the objects that appear in the current block have been tested. When the test result is NO, execution returns to process 403 via process 434, where the next object that appears in the current block is adopted as the current object. When the test result is YES, execution exits the subroutine via process 411 and advances to process 413, described above.

Similarly, subroutine 437, composed of processes 408–411, 435 and 436, generates additional motion vectors for each of the objects that appears in the current block, and determines whether or not any of the additional vectors can be used as the motion vector for predictively coding the current block. In processes 408 and 409, additional motion vectors for the current object are generated and are evaluated, and in process 410, a test is performed to determine whether any of the additional motion vectors generated for the current block is useable as the motion vector for predictively coding the current block. Then, in process 435, a test is performed to determine whether additional motion vectors have been generated for all the objects that appear in the current block. When the test result in process 435 is NO, execution returns to process 408 via process 436, where the next object that appears in the current block is selected as the current object. When the test result is YES, execution exits the subroutine and advances to process 412.

The order in which the objects that appear in the current block are selected as the current object may simply be the order of the objects' index numbers. However, it is preferable to select the objects as the current object in the order of their occupancy of the current block, so that the object that occupies the largest fraction of the current block is selected first. Potentially needless processing is avoided by selecting as the first current object the object that is most likely to yield a useable motion vector. Occupancy information for each object is stored in the entry for the current block in the visibility and coding table.

When the current picture is coded as a P-picture, the current block can be either predictively coded with forward MC-prediction or coded without prediction as an intra-coded block. When the current block is predictively coded, the motion descriptors of the objects that appear in the block provide important information as to what references to use for the prediction. Specifically, each motion descriptor describes the motion that was used to predict the object in the object-based picture signal. However, block-based coding is applied to a series of pictures, and not to individual objects. The boundary blocks of the arbitrarily-shaped objects as well as occlusion of objects make the transcoding difficult.

FIG. 13C shows an example of the coding process 390 of FIG. 12 used when the current block is a single-object block in which one or more of the tiles that appear in the block are coded without prediction, or in which one or more of the tiles that appear in the block are predictively coded using reference tiles that are interior tiles or boundary tiles, and are completely visible, partly visible, or completely hidden. Elements of the coding process 390 that correspond to the coding process 386 shown in FIG. 13A are indicated by the same reference numerals and will not be described further.

Execution starts at process 401. In process 441, a test is performed on the entry for the current block in the visibility and coding table to determine whether all the tiles that appear in the current block are non-predictively coded. A test result of YES indicates that no motion information exists in the entry for the current block in the visibility and coding table. When the test result is YES, execution advances to process 443, which will be described below. A test result of NO indicates that at least one of the tiles appearing in the current block is predictively coded, and that motion information for such tile exists in the entry for the current block in the visibility and coding table. When the test result is NO, execution advances to process 442.

In process 442, a test is performed to determine whether the reference tiles for all the tiles appearing in the current block are completely hidden in the reference picture. A test result of YES indicates that none of the reference picture was generated from the reference tiles of the current block because the reference tiles were hidden in the reference picture. In this case, none of the motion information that exists in the entry for the current block in the visibility and coding table can be used directly in predictively coding the current block. When the test result is YES, execution advances to process 443, which will be described below. A test result of NO indicates that part of the reference picture was generated from the reference tile of at least one of the tiles that appear in the current block, and that the motion information of such tile in the entry for the current block in the visibility and coding table can possibly be used to provide a motion vector that can be used in predictively coding the current block. When the test result is NO, execution advances to subroutine 402, described above.

When the subroutine 402 generates a YES result, indicating that a motion vector exists in the entry for the current block in the visibility and coding table that is useable for predictively coding the current block, execution advances to process 412, where the current block is predictively coded using the motion vector, as described above. Processing then advances to process 417, described above.

When the subroutine 402 generates a NO result, indicating that none of the motion vectors that exist in the entry for the current block in the visibility and coding is useable for predictively coding the current block, execution advances to process 443.

Process 443 selects a process for generating additional motion vectors for the current block. Potential motion vector generating processes include:

1. Refining the motion vectors in the entry for the current block in the visibility and coding table. This method is not available when all the tiles that appear in the current block are intra-coded or all the reference tiles for the tiles that appear in the current block are hidden;
2. Searching for a visible portion of the object in a previously-coded picture;
3. Predicting from the motion vectors of temporally or spatially neighboring blocks;
4. Performing fast, general-purpose-search motion estimation, e.g., log-search motion estimation; and
5. Performing full-search motion estimation.

The potential motion vector generating processes are set forth above in approximate order of implementation complexity and increasing demand for processing resources. The more complex options may only be applied when sufficient resources, such as time, computational hardware or computational cycles, are available. The decision that selects the motion vector generating process can be based, at least in part, on the test results generated by processes 441 and 442 and subroutine 402.

In process 444, a test is performed to determine whether sufficient resources are available to perform the selected motion vector generation process. When the test result is YES, execution advances to subroutine 407, described above, where the additional motion vector is generated using the selected motion vector generating process. The additional motion vector can be generated using the selected motion generating method by the motion estimator 211 in the partial encoder 326 shown in FIG. 6C.

When the test result in process 444 is NO, execution advances to process 445, where a decision is made to encode the current block without prediction. Execution then advances to processes 415 and 416, where the current block is non-predictively coded, as described above. Alternatively, when a NO result is obtained in process 444, execution can return to process 443 where a motion vector generating process that requires fewer resources can be selected.

The processing performed in subroutine 407 generates at least one additional motion vector and determines whether any of the at least one additional motion vector is useable for predictively coding the current block. When subroutine 407 exits to process 412, indicating that one of the additional motion vectors is useable, the current block is predictively coded in process 412, as described above. When subroutine 407 exits to process 413, indicating that none of the additional motion vectors is useable, a further evaluation of the existing and additional motion vectors is made in process 413 before the intra/inter coding decision in process 414 and the intra-coding test in process 415, as described above.

When the current block is a multiple-object (MO) block and the current picture is coded as a P-picture, the current block is coded in process 397 of FIG. 12 by a multiple-object version of the coding process 390 described above with reference to FIG. 13C. In the multiple-object version of the coding process, subroutines 402 and 407 shown in FIG. 13C are replaced with subroutines similar to the subroutines 432 and 437, respectively, shown in FIG. 13B. The object-based motion information will generally be less useful as the basis for determining the motion vectors for predictively coding the MO-blocks than for the SO-blocks. MO-blocks will typically require a greater number of searches, more sophisticated search procedures (e.g., searching the visible portion in the previously-coded picture for each of the multiple objects, as opposed to just one object), as well as a greater use of coding without prediction. Coding without prediction is always available as an alternative, and requires substantially fewer processing resources to implement than any of the search methods mentioned above. On the other hand, coding without prediction results in substantially more non-zero transform coefficients than predictive coding. Coarser quantizing may be required to allow the larger number of non-zero transform coefficients to be represented by a given bit rate. This may degrade the picture quality unacceptably. Alternatively, the current picture quality may be preserved by using a higher bit rate.

When the current block-based picture is coded as a B-picture, each block in the current picture can be coded in one of four modes, namely, without prediction, i.e., as an intra-coded block, predictively with forward MC-prediction (F-MC), predictively with backward MC-prediction (B-MC), and predictively with bidirectional MC-prediction (Bi-MC). Similarly, in the predictively-coded object-based picture signal, an instance of an object can be coded as a B-object with the same four possible coding modes, namely, intra, F-MC, B-MC, or Bi-MC.

Motion transcoding for B-pictures has similar problems to that for P-pictures, but transcoding B-pictures is subject to additional problems, and has additional possible processing modes.

When an object that appears in the current block of the current picture has been predictively coded using bidirectional MC-prediction, the reference tiles for the tiles that appear in the current block may be partially or completely hidden in either or both of the previously-coded pictures from which the reference picture for the current picture is derived. In this case, the Bi-MC motion information of the object cannot be used directly to determine the motion vector for predictively coding the current block. When the reference tiles are hidden in one of the previously-coded pictures, the method according to the invention changes the coding mode from bidirectional MC prediction to forward or backward MC prediction so that the reference picture is derived from only the other of the previously-coded pictures. For example, if the tiles in the previous reference picture are hidden but those in the following reference picture are not, then the coding process changes the temporal dependencies and predictively encodes the current block with backward MC-prediction. Similarly, if the reference tiles in the following reference picture are hidden, but those in the previous reference picture are not, the current block can be predictively coded using forward MC-prediction.

Furthermore, if the tiles that appear in the current block were predictively coded using forward MC-prediction, but the reference tiles in the previous reference picture are partly or completely hidden, the coding process can examine the following reference picture to determine whether it is possible to code the current block using backward MC-prediction. And if the tiles that appear in the current block were predictively coded using backward MC-prediction, but the reference tiles in the following reference picture are partly or completely hidden, the coding process can examine the previous reference picture to determine if it is possible to code the current block using forward MC-prediction. These changes may be achieved by extrapolating the motion vector from the previous picture to the future picture, or vice versa, and checking the quality of the prediction, as described above.

References in this disclosure to previous and following reference pictures are references to the presentation order of the pictures: all the pictures from which the reference picture is derived are coded before the current picture is coded.

In the predictively-coded object-based picture signal, the pattern of I, P, and B coding modes may differ among the objects. Moreover, the pattern of I, P and B coding modes in the object-based picture signal may differ from the coding modes of the desired block-based picture signal. As a result, it may be necessary to change the coding modes of one or more of the objects. This can be accomplished by applying the techniques described by one of the inventors in S. J. Wee, *Manipulating Temporal Dependencies in Compressed Video Data with Applications to Compressed Domain Processing of MPEG Video,* IEEE ICASSP, March 1999, to manipulate the temporal dependencies of the objects.

FIG. 13D shows an example of the coding process 391 of FIG. 12 used when the current picture is to be coded as a B-picture. Elements of the coding process 391 shown in FIG. 13D that correspond to elements of the coding process 390 shown in FIG. 13C are indicated using the same reference numerals, and will not be described in detail again.

When the test performed in process 442 returns a NO result, execution advances to process 451, where a test is performed on the entry for the current block in the visibility and coding table to determine whether the reference tiles in the previous reference picture for predictively coding the tiles that appear in the current block are completely hidden. A test result of YES indicates that none of the previous reference picture was generated from the reference tiles of the current block, and that none of the motion information for the previous reference picture that exists in the entry for the current block in the visibility and coding table can be used directly in predictively coding the current block. When the test result is NO, execution advances to process 456, which will be described below. When the test result is YES, execution advances to process 452, where the prediction mode is changed from either bidirectional or forward to backward.

Execution then advances to process 453, where a test is performed on the entry for the current block in the visibility and coding table to determine whether the original prediction mode of each of the tiles appearing in the current block was forward MC-prediction. When the test result is YES, execution advances to process 454, where the original motion vector of each tile that was coded using forward MC-prediction is modified to generate a motion vector suitable for use with backward MC-prediction. The original motion vector stored in the visibility and coding table may be modified simply by extrapolation, for example. Execution then advances to subroutine 402, which, when process 454 has previously been executed, is performed using the modified motion vectors in lieu of the original motion vectors.

For those tiles for which the test result in process 453 is NO, indicating that the tiles were predictively coded using bidirectional MC-prediction, execution advances to process 455, where the un-usable motion vector of the tile is discarded, i.e., the motion vector relating to the previous reference picture. Execution then advances to subroutine 402, which, when process 455 has previously been executed, is performed using only the motion vectors relating to the following reference picture.

When the test result in process 451 is NO, execution advances to process 456, as noted above. In process 456, a test is performed on the entry for the current block in the visibility and coding table to determine whether all the reference tiles in the following reference picture, if any, for predictively coding the tiles appearing in the current block are hidden. When the test result is NO, this indicates that it may be possible to code the current block with bidirectional MC-prediction using the motion information that exists in the visibility and coding table, and execution advances to subroutine 402, described above.

A test result of YES in process 456 indicates that none of the following reference picture was generated from the reference tiles of the current block, and that none of the motion information for the following reference picture that exists in the entry for the current block in the visibility and coding table can be used directly in predictively coding the current block. Thus, when the test result is YES, execution advances to process 457, where the prediction mode is changed from either bidirectional or backward to forward.

Execution then advances to process 458, where a test is performed to determine whether the original prediction mode of each of the tiles appearing in the current block is backward MC-prediction. When the test result is YES, execution advances to process 459, where the original motion vector of each tile that was coded using backward MC-prediction is modified to generate motion vector suitable for use with forward MC-prediction. The original motion vector stored in the visibility and coding table may be modified simply by extrapolation, for example.

Execution then advances to subroutine 402, which, when process 459 has previously been executed, is performed using the modified motion vectors in lieu of the original motion vectors.

For those tiles for which the test result in process 458 is NO, indicating that the tiles were predictively coded using bidirectional MC-prediction, execution advances to process 455, where the unusable motion vector of the tile is discarded, i.e., the motion vector relating to the following reference picture. Execution then advances to subroutine 402, which, when process 455 has previously been executed, is performed using only the motion vectors relating to the previous reference picture.

The remainder of the coding process 391 is the same as coding process 390, and will not be described further.

When the current block is a multiple-object (MO) block and the current picture is coded as a B-picture, the current block is coded in process 396 of FIG. 12 by a multiple-object version of the coding process 391 described above with reference to FIG. 13D. In the multiple-object version of the coding process, subroutines 402 and 407 shown in FIG. 13D are replaced with subroutines similar to the subroutines 432 and 437, respectively, shown in FIG. 13B.

In a number of important applications such as video conferencing, the predictively-coded object-based picture signal may represent the group of pictures as a number of foreground objects and a background object or a sprite. The properties of the background object or sprite can be exploited to greatly reduce the complexity of the object-based to block-based transcoding. For example, the content of the background object or sprite may remain static and the entire background object or sprite may move with a relatively simple uniform motion. For instance, in video conferencing, the entire background object may move with a simple translation or perspective transform as the camera pans. The translation or perspective transform represents the motion of the entire background object using one expression, rather than requiring an expression for each tile. Therefore, the single expression for the motion can be used to determine the motion vectors for the coding process for each block of the block-based picture signal.

Furthermore, all the blocks of the block-based picture that contain a portion of the background object are SO/All-Inter/All-Interior/All-Visible blocks, which are the simplest to process.

As noted above, further simplifications result when the background object or sprite is coded with block-based MC-prediction and block-DCT. When the tiles of the background object or sprite align exactly with the blocks into which the block-based picture is divided, the tiles of the background object can be transcoded by performing MPEG-4 Huffman decoding and inverse quantizing to recover blocks of DCT coefficients, and the blocks of DCT coefficients can be subject to the quantizing scheme of the block-based encoding, followed by Huffman coding. Similar techniques can be used to transcode other regular objects.

Instances in which the background does not change for a number of frames can be identified using the scene descriptors, for example. In such instances, the background does not have to be repetitively re-coded.

The embodiments of the transcoders and the modules thereof described in this disclosure may be constructed from discrete components, small-scale or large-scale integrated circuits, suitably-configured ASICs and other suitable hardware. Alternatively, the embodiments of the transcoder and the modules thereof may be constructed using a digital signal processor, microprocessor, microcomputer or computer with internal or external memory operating in response to a program such as the transcoding program fixed in the computer-readable medium according to the invention. In computer- and DSP-based embodiments, the various modules shown herein may be ephemeral, and may only exist temporarily as the program executes. In such embodiments, the transcoding program could be conveyed to the hardware on which it is to run by embodying the program in a suitable computer-readable medium, such as a set of floppy disks, a CD-ROM, a DVD-ROM, a read-only memory or could be transmitted to such hardware by a suitable data link.

Although this disclosure describes illustrative embodiments of the invention in detail, it is to be understood that the invention is not limited to the precise embodiments described, and that various modifications may be practiced within the scope of the invention defined by the appended claims.

We claim:

1. A method for transcoding a predictively-coded object-based picture signal representing a group of pictures to a predictively-coded block-based picture signal representing the group of pictures, the method comprising:

extracting a coded scene descriptor and coded object descriptors from the predictively-coded object-based picture signal and decoding the coded scene descriptor to generate a scene descriptor;

partially decoding coded object descriptors to generate respective partially-decoded object descriptors, the decoding including extracting coding information that describes coding of the coded object descriptors;

in response to the scene descriptor, generating from the partially-decoded object descriptors a frame of a partially-encoded block-based picture signal representing one of the pictures as a current picture; and generating a frame of the predictively-coded block-based picture signal representing the current picture by predictively coding, in response to at least part of the coding information, the partially-coded block-based picture signal to a uniform coding state.

2. The method of claim 1, in which:

generating the frame of the partially-encoded block-based picture signal includes generating a visibility and coding table for the current picture from the coding information; and in generating the frame of the partially-encoded block-based picture signal, the partially-coded block-based picture signal is predictively coded in response to the coding information included in the visibility and coding table.

3. The method of claim 2, in which the coding information includes information selected from the group consisting of information indicating whether the object is predictively or non-predictively coded, a motion descriptor for the object, occupancy of the block by the object, information indicating visibility of the object and a decoding state into which the object was partially decoded.

4. The method of claim 2, in which, generating the visibility and coding table generates a visibility and coding table including an entry for each block into which the current picture is divided for block-based coding, the entry including coding information for each of the objects that appears in the block.

5. The method of claim 1, in which generating the frame of the partially-encoded block-based picture signal includes identifying those of the objects that appear in each block into which the current picture is divided for block-based coding.

6. The method of claim 1, in which predictively coding the partially-coded block-based picture signal includes:

predictively coding a block of the partially-coded block-based picture signal using a motion vector; and basing the motion vector on a motion descriptor of an object that appears in the block.

7. The method of claim 6, additionally comprising:

adopting one of the blocks into which the current picture is divided for block-based coding as a current block and determining whether the current block is an all-inter/all interior/all visible block, and when the current block is an all-inter/all interior/all visible block, determining a cost of coding the current block using the motion descriptor of each of the objects that appear in the current block as the motion vector therefor; and coding the current block using one of the motion descriptors as the motion vector when the cost of coding is less than a predetermined cost.

8. The method of claim 7, additionally comprising, when the cost of coding is more than the predetermined cost:
- generating additional motion vectors for the current block;
- determining a cost of coding the current block using each of the additional motion vectors as the motion vector therefor;
- coding the current block using one of the additional motion descriptors as the motion vector when the cost of coding is less than a predetermined cost; and
- otherwise non-predictively coding the current block.

9. The method of claim 1, in which:
the objects are divided into tiles for object-based coding;
the current picture is predictively coded using a reference picture;
the method additionally comprises:
- adopting one of the blocks into which the current picture is divided for block-based coding as a current block, at least one tile of at least one of the objects appearing in the current block,
- determining whether all of the tiles of all of the objects that appear in the current block are non-predictively coded as a first condition,
- determining whether all of the tiles of all of the objects that appear in the current block are predictively coded using reference tiles that are hidden in the reference picture as a second condition,
- when at least one of the first condition and the second condition is met, generating an additional motion vector for the current block and testing whether the additional motion vector is useable to code the current block; and
- in predictively coding the partially-coded block-based picture signal to a uniform coding state, the current block is predictively coded using the additional motion vector when the additional motion vector is useable, and the current block is non-predictively coded when the additional motion vector is not useable.

10. The method of claim 1, in which:
the objects are divided into tiles for object-based coding;
the current picture is predictively coded as a B-picture using a previous reference picture and a following reference picture in presentation order;
the method additionally comprises:
- adopting one of the blocks into which the current picture is divided for block-based coding as a current block, at least one tile of at least one of the objects appearing in the current block,
- determining from the coding information when all of the tiles of all of the objects that appear in the current block are predictively coded using reference tiles that are hidden in only one of the reference pictures as a condition, and
- when the condition is met, changing a prediction mode for coding the current block to a coding mode in which the current block is coded using reference tiles that are visible in the other of the reference pictures.

11. The method of claim 10, in which:
when the tiles of the all the objects that appear in the current block are predictively coded using reference tiles that are hidden only in the following reference picture, changing the prediction mode includes:
- changing the coding mode of the current block from one of backward and bi-directional to forward,
- when the object was originally coded with backward prediction, generating a new motion vector for the current block by extrapolating to the previous reference picture the motion vector that referred to the following reference picture,
- when the object was originally coded with bi-directional prediction, generating a new motion vector for the current block by adopting only a motion vector referring to the previous reference picture, and
- coding the current block with forward prediction using the new motion vector; and when the tiles of the all the objects that appear in the current block are predictively coded using reference tiles that are hidden only in the previous reference picture, changing the prediction mode includes:
- changing the coding mode of the current block from one of forward and bi-directional to backward,
- when the object was originally coded with forward prediction, generating a new motion vector for the current block by extrapolating to the following reference picture the motion vector that referred to the previous reference picture,
- when the object was originally coded with bi-directional prediction, generating a new motion vector for the current block by adopting only a motion vector referring to the following reference picture, and
- coding the current block with backward prediction using the new motion vector.

12. The method of claim 1, in which:
the objects are divided into tiles for object-based coding;
the current picture is predictively coded as a P-picture using a previous reference picture in presentation order;
the method additionally comprises:
- adopting one of the blocks into which the current picture is divided for block-based coding as a current block, at least one tile of at least one of the objects appearing in the current block,
- determining from the coding information when all of the tiles of all of the objects that appear in the current block are predictively coded using reference tiles that are hidden in the previous reference picture as a condition; and
when the condition is met:
- changing coding of the current block to a prediction mode in which the current block is coded using new reference tiles that are visible in another of the pictures, and
- extrapolating a motion vector that indicates one of the hidden reference tiles to generate a motion vector for coding the current block with respect to the new reference tiles.

13. The method of claim 1, additionally comprising selecting for partial decoding the coded object descriptors of only ones of the objects visible in the current picture.

14. The method of claim 13, additionally comprising selecting for partial decoding the coded object descriptor of an object not visible in the current picture but that is required to decode an instance of the object appearing in a later-coded picture.

15. The method of claim 13, in which selecting the coded object descriptors includes:
- generating an object visibility table in response to the scene descriptor; and selecting the coded object descriptors in response to the object visibility table.

16. The method of claim 13, in which:

part of one of the objects is visible in the picture; and in selecting the coded object descriptors, only a portion of the coded object descriptor corresponding to the part of the one of the objects that is visible in the picture is selected for partial decoding.

17. The method of claim 1, in which:

the predictively-coded object-based picture signal is composed of a sequence of I-, P- and B-coded objects; and in generating a frame of the predictively-coded block-based picture signal, the predictively-coded block-based picture signal is generated with a sequence of I-pictures, P-pictures and B-pictures different from the sequence of I-, P- and B-coded objects in the predictively-coded object-based picture signal.

18. The method of claim 1, in which:

the predictively-coded object-based picture signal has coding properties including frame rate, spatial resolution and bit rate; and in generating a frame of the predictively-coded block-based picture signal, the predictively-coded block-based picture signal is generated with coding properties different from the coding properties of the predictively-coded object-based picture signal.

19. A transcoder for transcoding a predictively-coded object-based picture signal representing a group of pictures to a predictively-coded block-based picture signal representing the group of pictures, the transcoder comprising:

a partial decoder, including a demultiplexer that extracts a coded scene descriptor and coded object descriptors from the predictively-coded object-based picture signal, a scene descriptor decoder that decodes the coded scene descriptor to generate a scene descriptor, and an object descriptor decoder that partially decodes the coded object descriptors to generate respective partially-decoded object descriptors and that extract coding information that describes coding of the coded object descriptors;

a block-based picture signal generator that operates in response to the scene descriptor to generate from the partially-decoded object descriptors a frame of a partially-encoded block-based picture signal representing one of the pictures as a current picture; and a partial encoder configured to generate a frame of the predictively-coded block-based picture signal representing the current picture by predictively coding, in response to at least part of the coding information, the partially-coded block-based picture signal to a uniform coding state.

20. The transcoder of claim 19, additionally comprising:

a visibility and coding table that stores the coding information for the current picture from; and the partial encoder encodes the partially-coded block-based picture signal in response to the coding information stored in the visibility and coding table.

21. The transcoder of claim 19, in which the block-based picture signal generator is configured to identify those of the objects that appear in each block into which the current picture is divided for block-based coding.

22. The transcoder of claim 19, in which the partial encoder includes:

a variable coder that codes a block of the partially-coded block-based picture signal using a motion vector; and a coding mode module that generates the motion vector based on a motion descriptor of an object that appears in the block.

23. The transcoder of claim 19, in which the multiplexer is configured to select for feeding to the object descriptor decoder for partial decoding the coded object descriptors of only ones of the objects visible in the current picture.

24. The transcoder of claim 23, in which the multiplexer is configured additionally to select for feeding to the object descriptor decoder the coded object descriptor of an object not visible in the current picture but that is required to decode an instance of the object appearing in a later-coded picture.

25. The transcoder of claim 23, in which:

the partial decoder includes an object visibility table; and the demultiplexer is configured to select the coded object descriptors for feeding to the object descriptor decoder in response to the object visibility table.

26. The transcoder of claim 23, in which:

part of one of the objects is visible in the picture; and the multiplexer is configured to select only a portion of the coded object descriptor corresponding to the part of the one of the objects that is visible in the picture for feeding to the object descriptor decoder.

27. A computer-readable medium in which is fixed a computer program that instructs a computer to perform a transcoding method that transcodes a predictively-coded object-based picture signal representing a group of pictures to a predictively-coded block-based picture signal representing the group of pictures, the transcoding method comprising:

extracting a coded scene descriptor and coded object descriptors from the predictively-coded object-based picture signal and decoding the coded scene descriptor to generate a scene descriptor;

partially decoding coded object descriptors to generate respective partially-decoded object descriptors, the decoding including extracting coding information that describes coding of the coded object descriptors;

in response to the scene descriptor, generating from the partially-decoded object descriptors a frame of a partially-encoded block-based picture signal representing one of the pictures as a current picture; and generating a frame of the predictively-coded block-based picture signal representing the current picture by predictively coding, in response to at least part of the coding information, the partially-coded block-based picture signal to a uniform coding state.

28. The computer-readable medium of claim 27, in which, in the transcoding method:

generating the frame of the partially-encoded block-based picture signal includes generating a visibility and coding table for the current picture from the coding information; and in generating the frame of the partially-encoded block-based picture signal, the partially-coded block-based picture signal is predictively coded in response to the coding information included in the visibility and coding table.

29. The computer-readable medium of claim 27, in which, in the transcoding method, generating the frame of the partially-encoded block-based picture signal includes identifying those of the objects that appear in each block into which the current picture is divided for block-based coding.

30. The computer-readable medium of claim 27, in which, in the transcoding method, predictively coding the partially-coded block-based picture signal includes:

predictively coding a block of the partially-coded block-based picture signal using a motion vector; and basing the motion vector on a motion descriptor of an object that appears in the block.

31. The computer-readable medium of claim 27, in which the transcoding method additionally comprises selecting for partial decoding the coded object descriptors of only ones of the objects visible in the current picture.

32. The computer-readable medium of claim 27, in which the transcoding method additionally comprises selecting for partial decoding the coded object descriptor of an object not visible in the current picture but that is required to decode an instance of the object appearing in a later-coded picture.

* * * * *